US011709865B2

(12) United States Patent
King et al.

(10) Patent No.: US 11,709,865 B2
(45) Date of Patent: Jul. 25, 2023

(54) METHOD FOR SHARING AND SEARCHING PLAYLISTS

(71) Applicant: Huawei Technologies Co., Ltd., Shenzhen (CN)

(72) Inventors: Ryan Eric King, San Diego, CA (US); David E. Brown, Boston, MA (US); Robert Porter, San Carlos, CA (US); Adam Korman, Glendale, CA (US); Manish Upendran, San Jose, CA (US); Kathleen Wilson, San Diego, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 575 days.

(21) Appl. No.: 16/732,888

(22) Filed: Jan. 2, 2020

(65) Prior Publication Data

US 2020/0142907 A1 May 7, 2020

Related U.S. Application Data

(63) Continuation of application No. 15/074,760, filed on Mar. 18, 2016, now Pat. No. 10,614,097, which is a
(Continued)

(51) Int. Cl.
*H04L 29/00* (2006.01)
*G06F 16/27* (2019.01)
(Continued)

(52) U.S. Cl.
CPC ........ *G06F 16/273* (2019.01); *G06F 16/3344* (2019.01); *G06F 16/4387* (2019.01);
(Continued)

(58) Field of Classification Search
CPC .. G06F 16/273; G06F 16/4393; G06F 16/637; G06F 16/3344; G06F 16/4387;
(Continued)

(56) References Cited

U.S. PATENT DOCUMENTS

| 253,743 A | 2/1882 | Mensing |
| 1,235,999 A | 8/1917 | Neeley |

(Continued)

FOREIGN PATENT DOCUMENTS

| EP | 1176840 A1 | 1/2002 |
| EP | 1489800 A1 | 12/2004 |

(Continued)

OTHER PUBLICATIONS

Brown, Janelle; "MP3 free-for-all"; [Online] XP002219000; Retrieved from the Internet http://groups.google.com/groups?selm=Pine.GSU. 4,10,10002050020300,16171-100000%40adore.lightlink.com&output= gplain; retrieved on Oct. 30, 2002; 6 pages.

(Continued)

*Primary Examiner* — Brandon Hoffman
*Assistant Examiner* — Michael D Anderson
(74) *Attorney, Agent, or Firm* — Conley Rose, P.C.

(57) ABSTRACT

A system that provides for the accessing and playing of media files having differing associated rights such as non-DRM media files, purchased and downloaded media files, subscription download files such as tethered downloads, and subscription streamed DRM files. The system also provides a method and user interface for sharing a media collection among computing devices in communication via a network. The system allows access and playback, from each computing device on a network, of all media files in a media collection, regardless of their associated rights.

27 Claims, 12 Drawing Sheets

Related U.S. Application Data continuation of application No. 14/092,479, filed on Nov. 27, 2013, now abandoned, which is a continuation of application No. 11/315,989, filed on Dec. 21, 2005, now Pat. No. 8,601,572.

(60) Provisional application No. 60/678,718, filed on May 5, 2005, provisional application No. 60/657,222, filed on Feb. 28, 2005.

(51) Int. Cl.

| | | |
|---|---|---|
| *H04L 9/40* | (2022.01) | |
| *G06F 16/635* | (2019.01) | |
| *G06F 16/638* | (2019.01) | |
| *G06F 16/33* | (2019.01) | |
| *G06F 16/438* | (2019.01) | |
| *G06F 16/9535* | (2019.01) | |
| *G06F 21/10* | (2013.01) | |
| *G06F 21/62* | (2013.01) | |
| *G06Q 10/10* | (2023.01) | |
| *G06Q 20/12* | (2012.01) | |
| *G06Q 30/02* | (2023.01) | |
| *G06Q 30/06* | (2023.01) | |
| *G11B 27/10* | (2006.01) | |
| *G11B 27/34* | (2006.01) | |
| *H04L 12/18* | (2006.01) | |
| *H04L 51/04* | (2022.01) | |
| *H04N 7/173* | (2011.01) | |
| *H04N 21/254* | (2011.01) | |
| *H04N 21/41* | (2011.01) | |
| *H04N 21/414* | (2011.01) | |
| *H04N 21/433* | (2011.01) | |
| *H04N 21/462* | (2011.01) | |
| *H04N 21/4627* | (2011.01) | |
| *H04N 21/472* | (2011.01) | |
| *H04N 21/4788* | (2011.01) | |
| *H04N 21/482* | (2011.01) | |
| *H04N 21/658* | (2011.01) | |
| *H04N 21/81* | (2011.01) | |
| *H04N 21/8355* | (2011.01) | |
| *H04L 67/06* | (2022.01) | |
| *H04L 67/00* | (2022.01) | |
| *H04L 67/306* | (2022.01) | |
| *H04L 65/612* | (2022.01) | |
| *H04L 65/1101* | (2022.01) | |
| *H04L 67/62* | (2022.01) | |
| *H04L 67/63* | (2022.01) | |
| *H04L 67/50* | (2022.01) | |
| *G11B 20/00* | (2006.01) | |

(52) U.S. Cl.
CPC ........ *G06F 16/4393* (2019.01); *G06F 16/637* (2019.01); *G06F 16/639* (2019.01); *G06F 16/9535* (2019.01); *G06F 21/10* (2013.01); *G06F 21/6236* (2013.01); *G06Q 10/10* (2013.01); *G06Q 20/1235* (2013.01); *G06Q 30/02* (2013.01); *G06Q 30/06* (2013.01); *G11B 27/105* (2013.01); *G11B 27/34* (2013.01); *H04L 12/1822* (2013.01); *H04L 51/04* (2013.01); *H04L 63/0263* (2013.01); *H04L 63/101* (2013.01); *H04L 63/105* (2013.01); *H04L 65/1101* (2022.05); *H04L 65/612* (2022.05); *H04L 67/06* (2013.01); *H04L 67/306* (2013.01); *H04L 67/34* (2013.01); *H04L 67/535* (2022.05); *H04L 67/62* (2022.05); *H04L 67/63* (2022.05); *H04N 7/17318* (2013.01); *H04N 21/2541* (2013.01); *H04N 21/4126* (2013.01); *H04N 21/41407* (2013.01); *H04N 21/4331* (2013.01); *H04N 21/4622* (2013.01); *H04N 21/4627* (2013.01); *H04N 21/4788* (2013.01); *H04N 21/47214* (2013.01); *H04N 21/4825* (2013.01); *H04N 21/658* (2013.01); *H04N 21/8113* (2013.01); *H04N 21/8355* (2013.01); *G06F 2213/0038* (2013.01); *G06F 2216/01* (2013.01); *G06F 2221/2113* (2013.01); *G06F 2221/2137* (2013.01); *G11B 20/00086* (2013.01); *H04L 2463/101* (2013.01); *Y10S 707/913* (2013.01)

(58) Field of Classification Search
CPC ... G06F 16/9535; G06F 21/10; H04L 67/535; H04L 65/1101; H04L 67/62
USPC .......................................................... 726/4
See application file for complete search history.

(56) References Cited

U.S. PATENT DOCUMENTS

| | | |
|---|---|---|
| 1,877,241 A | 9/1932 | Hultman et al. |
| 2,040,010 A | 5/1936 | McMahon et al. |
| 3,540,111 A | 11/1970 | Wainwright |
| 3,688,086 A | 8/1972 | Levasseur et al. |
| 4,484,430 A | 11/1984 | Rossman |
| 4,890,925 A | 1/1990 | Kitamori et al. |
| 5,055,265 A | 10/1991 | Finlan et al. |
| 5,124,207 A | 6/1992 | Hayashi et al. |
| 5,205,101 A | 4/1993 | Swan et al. |
| 5,493,677 A | 2/1996 | Balogh et al. |
| 5,566,353 A | 10/1996 | Cho et al. |
| 5,616,876 A | 4/1997 | Cluts |
| 5,623,786 A | 4/1997 | Demeyer |
| 5,729,741 A | 3/1998 | Liaguno et al. |
| 5,748,956 A | 5/1998 | Lafer et al. |
| 5,796,945 A | 8/1998 | Tarabella |
| 5,832,501 A | 11/1998 | Kain et al. |
| 5,862,325 A | 1/1999 | Reed et al. |
| 5,864,870 A | 1/1999 | Guck |
| 5,886,698 A | 3/1999 | Sciammarella et al. |
| 5,890,152 A | 3/1999 | Rapaport et al. |
| 5,892,535 A | 4/1999 | Allen et al. |
| 5,903,892 A | 5/1999 | Hoffert et al. |
| 5,911,776 A | 6/1999 | Guck |
| 5,915,019 A | 6/1999 | Ginter et al. |
| 5,928,330 A | 7/1999 | Goetz et al. |
| 5,950,173 A | 9/1999 | Perkowski |
| 5,964,068 A | 10/1999 | O'Neill |
| 5,982,369 A | 11/1999 | Sciammarella et al. |
| 5,983,236 A | 11/1999 | Yager et al. |
| 5,996,015 A | 11/1999 | Day et al. |
| 6,006,241 A | 12/1999 | Purnaveja et al. |
| 6,012,068 A | 1/2000 | Boezeman et al. |
| 6,064,380 A | 5/2000 | Swenson et al. |
| 6,065,267 A | 5/2000 | Fisher |
| 6,073,727 A | 6/2000 | Difranza et al. |
| 6,115,988 A | 9/2000 | Reisdorff |
| 6,118,450 A | 9/2000 | Proehl et al. |
| 6,138,119 A | 10/2000 | Hall et al. |
| 6,157,377 A | 12/2000 | Shah-Nazaroff et al. |
| 6,192,340 B1 | 2/2001 | Abecassis |
| 6,210,715 B1 | 4/2001 | Starling et al. |
| 6,226,672 B1 | 5/2001 | Demartin et al. |
| 6,232,539 B1 | 5/2001 | Looney et al. |
| 6,248,946 B1 | 6/2001 | Dwek |
| 6,256,623 B1 | 7/2001 | Jones |
| 6,292,775 B1 | 9/2001 | Holmes |
| 6,308,204 B1 | 10/2001 | Nathan et al. |
| 6,342,396 B1 | 1/2002 | Perrin et al. |
| 6,356,971 B1 | 3/2002 | Katz et al. |
| 6,389,467 B1 | 5/2002 | Eyal |
| 6,393,430 B1 | 5/2002 | Van Ryzin |

(56) References Cited

U.S. PATENT DOCUMENTS

| | | |
|---|---|---|
| 6,421,726 B1 | 7/2002 | Kenner et al. |
| 6,427,140 B1 | 7/2002 | Ginter et al. |
| 6,446,080 B1 | 9/2002 | Van Ryzin |
| 6,466,918 B1 | 10/2002 | Spiegel et al. |
| 6,477,704 B1 | 11/2002 | Cremia |
| 6,484,157 B1 | 11/2002 | Chowdhury et al. |
| 6,484,199 B2 | 11/2002 | Eyal et al. |
| 6,526,411 B1 | 2/2003 | Ward |
| 6,529,835 B1 | 3/2003 | Wada et al. |
| 6,530,944 B2 | 3/2003 | West et al. |
| 6,538,665 B2 | 3/2003 | Crow et al. |
| 6,545,209 B1 | 4/2003 | Flannery et al. |
| 6,549,922 B1 | 4/2003 | Srivastava et al. |
| 6,574,609 B1 | 6/2003 | Downs et al. |
| 6,587,127 B1 | 7/2003 | Leeke et al. |
| 6,587,837 B1 | 7/2003 | Spagna et al. |
| 6,605,770 B2 | 8/2003 | Yamane et al. |
| 6,609,096 B1 | 8/2003 | De Bonet et al. |
| 6,609,105 B2 | 8/2003 | Van Zoest et al. |
| 6,609,253 B1 | 8/2003 | Swix et al. |
| 6,612,231 B2 | 9/2003 | Shimizu et al. |
| 6,618,144 B1 | 9/2003 | Reed |
| 6,654,367 B1 | 11/2003 | Kaufman |
| 6,657,116 B1 | 12/2003 | Gunnerson |
| 6,662,231 B1 | 12/2003 | Drosset et al. |
| 6,677,968 B1 | 1/2004 | Appelman |
| 6,686,970 B1 | 2/2004 | Windle |
| 6,691,162 B1 | 2/2004 | Wick |
| 6,699,724 B1 | 3/2004 | West et al. |
| 6,708,154 B2 | 3/2004 | Acero |
| 6,710,366 B1 | 3/2004 | Lee et al. |
| 6,712,051 B1 | 3/2004 | Lakin |
| 6,718,308 B1 | 4/2004 | Nolting |
| 6,721,489 B1 | 4/2004 | Benyamin et al. |
| 6,728,729 B1 | 4/2004 | Jawa et al. |
| 6,731,312 B2 | 5/2004 | Robbin |
| 6,735,628 B2 | 5/2004 | Eyal et al. |
| 6,738,766 B2 | 5/2004 | Peng |
| 6,748,395 B1 | 6/2004 | Picker et al. |
| 6,760,042 B2 | 7/2004 | Zetts |
| 6,760,721 B1 | 7/2004 | Chasen et al. |
| 6,763,345 B1 | 7/2004 | Hempleman et al. |
| 6,772,212 B1 | 8/2004 | Lau et al. |
| 6,816,944 B2 | 11/2004 | Peng |
| 6,820,238 B1 | 11/2004 | Auflick et al. |
| 6,829,033 B2 | 12/2004 | Hose et al. |
| 6,850,256 B2 | 2/2005 | Crow et al. |
| 6,859,838 B1 | 2/2005 | Puranik et al. |
| 6,892,196 B1 | 5/2005 | Hughes |
| 6,922,759 B1 | 7/2005 | Garritsen |
| 6,928,419 B2 | 8/2005 | Stefik et al. |
| 6,928,423 B1 | 8/2005 | Yamanaka |
| 6,928,433 B2 | 8/2005 | Goodman |
| 6,933,433 B2 | 8/2005 | Porteus et al. |
| 6,941,324 B2 | 9/2005 | Plastina et al. |
| 6,943,324 B2 | 9/2005 | Ahuja |
| 6,944,612 B2 | 9/2005 | Roustant et al. |
| 6,968,179 B1 | 11/2005 | De Vries et al. |
| 6,972,363 B2 | 12/2005 | Georges et al. |
| 6,987,221 B2 | 1/2006 | Platt |
| 7,007,438 B1 | 3/2006 | Shields et al. |
| 7,013,290 B2 | 3/2006 | Ananian |
| 7,020,704 B1 | 3/2006 | Lipscomb et al. |
| 7,024,424 B1 | 4/2006 | Platt et al. |
| 7,043,477 B2 | 5/2006 | Mercer et al. |
| 7,047,406 B2 | 5/2006 | Schleicher et al. |
| 7,051,212 B2 | 5/2006 | Ginter et al. |
| 7,054,888 B2 | 5/2006 | Lachapelle et al. |
| 7,058,608 B2 | 6/2006 | Nagata et al. |
| 7,065,342 B1 | 6/2006 | Rolf |
| 7,076,652 B2 | 7/2006 | Ginter |
| 7,095,854 B1 | 8/2006 | Ginter et al. |
| 7,096,234 B2 | 8/2006 | Plastina et al. |
| 7,099,846 B1 | 8/2006 | Ishibashi et al. |
| 7,100,199 B2 | 8/2006 | Ginter et al. |
| 7,107,395 B1 | 9/2006 | Ofek et al. |
| 7,111,009 B1 | 9/2006 | Gupta et al. |
| 7,113,767 B2 | 9/2006 | Vaeaenaenen |
| 7,113,912 B2 | 9/2006 | Stefik et al. |
| 7,120,800 B2 | 10/2006 | Ginter et al. |
| 7,124,302 B2 | 10/2006 | Ginter et al. |
| 7,127,454 B2 | 10/2006 | Deguchi |
| 7,133,845 B1 | 11/2006 | Ginter et al. |
| 7,136,874 B2 | 11/2006 | Mercer et al. |
| 7,146,404 B2 | 12/2006 | Kay et al. |
| 7,159,000 B2 | 1/2007 | Plastina et al. |
| 7,159,174 B2 | 1/2007 | Johnson et al. |
| 7,216,008 B2 | 5/2007 | Sakata |
| 7,216,290 B2 | 5/2007 | Goldstein |
| 7,219,308 B2 | 5/2007 | Novak et al. |
| 7,227,073 B2 | 6/2007 | Kim |
| 7,256,341 B2 | 8/2007 | Plastina et al. |
| 7,262,357 B2 | 8/2007 | Plastina et al. |
| 7,275,063 B2 | 9/2007 | Horn |
| 7,277,852 B2 | 10/2007 | Iyoku et al. |
| 7,281,034 B1 | 10/2007 | Eyal |
| 7,290,285 B2 | 10/2007 | McCurdy et al. |
| 7,310,350 B1 | 12/2007 | Shao et al. |
| 7,345,234 B2 | 3/2008 | Plastina et al. |
| 7,358,434 B2 | 4/2008 | Plastina et al. |
| 7,395,339 B2 | 7/2008 | Kirkland |
| 7,409,639 B2 | 8/2008 | Dempski et al. |
| 7,421,656 B2 | 9/2008 | Fong et al. |
| 7,426,537 B2 | 9/2008 | Lee et al. |
| 7,454,406 B2 | 11/2008 | Kaplan et al. |
| 7,464,112 B2 | 12/2008 | Plastina et al. |
| 7,472,353 B1 | 12/2008 | Wolff et al. |
| 7,483,958 B1 * | 1/2009 | Elabbady ............... G06F 21/10 709/219 |
| 7,521,625 B2 | 4/2009 | Robbin et al. |
| 7,533,105 B2 | 5/2009 | Mitchell et al. |
| 7,562,301 B1 | 7/2009 | Wolff et al. |
| 7,590,659 B2 | 9/2009 | Merger et al. |
| 7,599,610 B2 | 10/2009 | Benyamin et al. |
| 7,617,278 B1 | 11/2009 | Edelman et al. |
| 7,620,467 B2 | 11/2009 | Lee et al. |
| 7,623,648 B1 | 11/2009 | Oppenheim et al. |
| 7,647,613 B2 | 1/2010 | Drakoulis et al. |
| 7,667,124 B2 | 2/2010 | Robbin et al. |
| 7,672,975 B2 | 3/2010 | Plastina et al. |
| 7,680,814 B2 | 3/2010 | Mercer et al. |
| 7,681,035 B1 | 3/2010 | Ayars et al. |
| 7,685,204 B2 | 3/2010 | Rogers |
| 7,685,642 B2 | 3/2010 | Gilliam et al. |
| 7,698,223 B2 | 4/2010 | Padawer et al. |
| 7,698,288 B2 | 4/2010 | Kawabe et al. |
| 7,698,654 B2 | 4/2010 | Fong et al. |
| 7,707,221 B2 | 4/2010 | Dunning et al. |
| 7,711,838 B1 | 5/2010 | Boulter et al. |
| 7,725,494 B2 | 5/2010 | Rogers et al. |
| 7,725,498 B2 | 5/2010 | Barsness et al. |
| 7,739,601 B1 | 6/2010 | Wong et al. |
| 7,739,723 B2 | 6/2010 | Rogers et al. |
| 7,743,329 B2 | 6/2010 | Rahman et al. |
| 7,747,620 B2 | 6/2010 | Beaupre |
| 7,757,171 B1 | 7/2010 | Wong et al. |
| 7,757,182 B2 | 7/2010 | Elliott et al. |
| 7,765,192 B2 | 7/2010 | Svendsen |
| 7,765,245 B2 | 7/2010 | Nichols et al. |
| 7,769,903 B2 | 8/2010 | Robbin et al. |
| 7,774,713 B2 | 8/2010 | Mital et al. |
| 7,779,355 B1 | 8/2010 | Erol et al. |
| 7,797,446 B2 | 9/2010 | Heller et al. |
| 7,797,454 B2 | 9/2010 | Apostolopoulos et al. |
| 7,805,677 B2 | 9/2010 | Takakuwa et al. |
| 7,818,350 B2 | 10/2010 | New et al. |
| 7,827,259 B2 | 11/2010 | Heller et al. |
| 7,827,312 B2 | 11/2010 | Ramswamy et al. |
| 7,831,605 B2 | 11/2010 | Plastina et al. |
| 7,840,292 B2 | 11/2010 | Buil et al. |
| 7,840,620 B2 | 11/2010 | Vignoli et al. |
| 7,844,820 B2 | 11/2010 | Martinez |
| 7,844,835 B2 | 11/2010 | Ginter et al. |
| 7,856,404 B2 | 12/2010 | Evans et al. |

(56) References Cited

U.S. PATENT DOCUMENTS

| | | |
|---|---|---|
| 7,860,342 B2 | 12/2010 | Levien et al. |
| 7,860,830 B2 | 12/2010 | Mirrashidi et al. |
| 7,882,110 B2 | 2/2011 | Bahr |
| 7,890,598 B2 | 2/2011 | Lakamp |
| 7,895,334 B1 | 2/2011 | Tu et al. |
| 7,904,417 B2 | 3/2011 | Anderson et al. |
| 7,921,116 B2 | 4/2011 | Finkelstein et al. |
| 7,925,682 B2 | 4/2011 | Moore et al. |
| 7,925,976 B2 | 4/2011 | Shin et al. |
| 7,934,159 B1 | 4/2011 | Rahman et al. |
| 7,937,450 B2 | 5/2011 | Janik |
| 7,937,671 B2 | 5/2011 | Leibhold et al. |
| 7,956,272 B2 | 6/2011 | Wysocki et al. |
| 7,958,441 B2 | 6/2011 | Heller et al. |
| 7,966,551 B2 | 6/2011 | Plastina et al. |
| 7,970,799 B2 | 6/2011 | Arrouye et al. |
| 7,971,261 B2 | 6/2011 | Pestoni |
| 7,984,505 B2 | 7/2011 | Read |
| 7,985,911 B2 | 7/2011 | Oppenheimer et al. |
| 7,991,271 B2 | 8/2011 | Candelore |
| 8,028,038 B2 | 9/2011 | Weel |
| 8,028,323 B2 | 9/2011 | Weel |
| 8,041,186 B1 | 10/2011 | Black |
| 8,046,424 B2 | 10/2011 | Novik et al. |
| 8,126,938 B2 | 2/2012 | Cohen et al. |
| 8,161,411 B2 | 4/2012 | Robbin et al. |
| 8,316,128 B2 | 11/2012 | Macleod et al. |
| 8,346,798 B2 | 1/2013 | Spiegelman et al. |
| 8,375,008 B1 | 2/2013 | Gomes |
| 8,447,697 B2 | 5/2013 | Wang et al. |
| 8,554,799 B2 | 10/2013 | Ott et al. |
| 8,601,572 B2 | 12/2013 | King et al. |
| 8,644,684 B2 | 2/2014 | Koshida et al. |
| 8,677,507 B2 | 3/2014 | Ginter et al. |
| 8,712,825 B1 | 4/2014 | Holcombe et al. |
| 10,019,500 B2 | 7/2018 | Spiegelman et al. |
| 2001/0013061 A1 | 8/2001 | Demartin et al. |
| 2001/0014882 A1 | 8/2001 | Stefik et al. |
| 2001/0018858 A1 | 9/2001 | Dwek |
| 2001/0025256 A1 | 9/2001 | Oliphant et al. |
| 2001/0033296 A1 | 10/2001 | Fullerton et al. |
| 2001/0042107 A1 | 11/2001 | Palm |
| 2001/0047290 A1 | 11/2001 | Petras et al. |
| 2002/0001395 A1 | 1/2002 | Davis et al. |
| 2002/0002039 A1 | 1/2002 | Qureshey et al. |
| 2002/0002468 A1 | 1/2002 | Spagna |
| 2002/0002498 A1 | 1/2002 | Hatakeyama |
| 2002/0003879 A1 | 1/2002 | Ibaraki et al. |
| 2002/0010652 A1 | 1/2002 | Deguchi |
| 2002/0010759 A1 | 1/2002 | Hitson et al. |
| 2002/0013784 A1 | 1/2002 | Swanson |
| 2002/0013852 A1 | 1/2002 | Janik |
| 2002/0040326 A1 | 4/2002 | Spratt |
| 2002/0042834 A1 | 4/2002 | Kremens et al. |
| 2002/0045960 A1 | 4/2002 | Phillips et al. |
| 2002/0049037 A1 | 4/2002 | Christensen et al. |
| 2002/0049594 A1 | 4/2002 | Moore et al. |
| 2002/0049731 A1 | 4/2002 | Kotani |
| 2002/0052885 A1 | 5/2002 | Levy |
| 2002/0052933 A1 | 5/2002 | Leonhard et al. |
| 2002/0054134 A1 | 5/2002 | Kelts |
| 2002/0069746 A1 | 6/2002 | Taira et al. |
| 2002/0072967 A1 | 6/2002 | Jacobs et al. |
| 2002/0078029 A1 | 6/2002 | Pachet |
| 2002/0080842 A1 | 6/2002 | An et al. |
| 2002/0083031 A1 | 6/2002 | De Varax et al. |
| 2002/0083060 A1 | 6/2002 | Wang et al. |
| 2002/0087887 A1 | 7/2002 | Busam et al. |
| 2002/0089529 A1 | 7/2002 | Robbin |
| 2002/0093884 A1 | 7/2002 | Hochendoner |
| 2002/0097401 A1 | 7/2002 | Maleki et al. |
| 2002/0099731 A1 | 7/2002 | Abajian |
| 2002/0103797 A1 | 8/2002 | Goel et al. |
| 2002/0107803 A1 | 8/2002 | Lisanke et al. |
| 2002/0107806 A1 | 8/2002 | Higashi et al. |
| 2002/0107850 A1 | 8/2002 | Sugimoto et al. |
| 2002/0108115 A1 | 8/2002 | Palmer |
| 2002/0113824 A1 | 8/2002 | Myers |
| 2002/0120925 A1 | 8/2002 | Logan |
| 2002/0122051 A1 | 9/2002 | Hose et al. |
| 2002/0126135 A1 | 9/2002 | Ball et al. |
| 2002/0128856 A1 | 9/2002 | Stefik et al. |
| 2002/0134220 A1 | 9/2002 | Yamane et al. |
| 2002/0138619 A1 | 9/2002 | Ramaley et al. |
| 2002/0143907 A1 | 10/2002 | Tsurubayashi |
| 2002/0151327 A1 | 10/2002 | Levitt |
| 2002/0152173 A1 | 10/2002 | Rudd |
| 2002/0152267 A1 | 10/2002 | Lennon |
| 2002/0152278 A1 | 10/2002 | Pontenzone et al. |
| 2002/0154759 A1 | 10/2002 | Ishii |
| 2002/0156546 A1 | 10/2002 | Ramaswamy |
| 2002/0156704 A1 | 10/2002 | Kolls |
| 2002/0172457 A1 | 11/2002 | Tapalian et al. |
| 2002/0175931 A1 | 11/2002 | Holtz et al. |
| 2002/0180803 A1* | 12/2002 | Kaplan ............... H04L 65/1101 715/810 |
| 2002/0184111 A1 | 12/2002 | Swanson |
| 2002/0184623 A1 | 12/2002 | Hodge et al. |
| 2002/0188363 A1 | 12/2002 | Ashy |
| 2002/0194195 A1 | 12/2002 | Fenton et al. |
| 2002/0194260 A1 | 12/2002 | Headley et al. |
| 2003/0001880 A1 | 1/2003 | Holtz et al. |
| 2003/0009423 A1 | 1/2003 | Wang et al. |
| 2003/0009427 A1 | 1/2003 | Wang et al. |
| 2003/0014477 A1 | 1/2003 | Oppenheimer et al. |
| 2003/0014767 A1 | 1/2003 | Stumphauzer et al. |
| 2003/0015464 A1 | 1/2003 | Marioni |
| 2003/0023427 A1 | 1/2003 | Cassin et al. |
| 2003/0023975 A1 | 1/2003 | Schrader et al. |
| 2003/0028488 A1 | 2/2003 | Mohammed et al. |
| 2003/0028489 A1 | 2/2003 | Williamson |
| 2003/0028505 A1 | 2/2003 | O'Rourke et al. |
| 2003/0028539 A1 | 2/2003 | Nunome et al. |
| 2003/0031176 A1 | 2/2003 | Sim |
| 2003/0037035 A1 | 2/2003 | Deguchi |
| 2003/0041108 A1 | 2/2003 | Henrick et al. |
| 2003/0046273 A1 | 3/2003 | Deshpande |
| 2003/0046399 A1 | 3/2003 | Boulter et al. |
| 2003/0049866 A1 | 3/2003 | Bushway et al. |
| 2003/0050834 A1 | 3/2003 | Caplan |
| 2003/0050919 A1 | 3/2003 | Brown et al. |
| 2003/0051149 A1 | 3/2003 | Robert |
| 2003/0051238 A1 | 3/2003 | Barone |
| 2003/0055743 A1 | 3/2003 | Murcko |
| 2003/0065639 A1 | 4/2003 | Fiennes et al. |
| 2003/0071851 A1 | 4/2003 | Unger et al. |
| 2003/0088571 A1 | 5/2003 | Ekkel |
| 2003/0093790 A1 | 5/2003 | Logan et al. |
| 2003/0096302 A1 | 5/2003 | Yguerabide et al. |
| 2003/0110228 A1 | 6/2003 | Xu et al. |
| 2003/0110502 A1 | 6/2003 | Creed et al. |
| 2003/0112432 A1 | 6/2003 | Yguerabide et al. |
| 2003/0120928 A1 | 6/2003 | Cato et al. |
| 2003/0124733 A1 | 7/2003 | Bushway et al. |
| 2003/0131252 A1 | 7/2003 | Barton |
| 2003/0135464 A1 | 7/2003 | Mourad et al. |
| 2003/0135513 A1 | 7/2003 | Quinn et al. |
| 2003/0151618 A1 | 8/2003 | Johnson et al. |
| 2003/0158737 A1 | 8/2003 | Csicsatka |
| 2003/0158780 A1 | 8/2003 | Isobe et al. |
| 2003/0167236 A1 | 9/2003 | Stefik et al. |
| 2003/0172090 A1 | 9/2003 | Asunmaa et al. |
| 2003/0174861 A1 | 9/2003 | Levy et al. |
| 2003/0174923 A1 | 9/2003 | Arnold et al. |
| 2003/0176937 A1 | 9/2003 | Janky et al. |
| 2003/0182254 A1 | 9/2003 | Plastina et al. |
| 2003/0182315 A1 | 9/2003 | Plastina et al. |
| 2003/0182328 A1 | 9/2003 | Paquette et al. |
| 2003/0182428 A1 | 9/2003 | Li et al. |
| 2003/0182579 A1 | 9/2003 | Leporini et al. |
| 2003/0191753 A1 | 10/2003 | Hoch |
| 2003/0195863 A1 | 10/2003 | Marsh |
| 2003/0200452 A1 | 10/2003 | Tagawa et al. |
| 2003/0202431 A1 | 10/2003 | Kim et al. |

(56) References Cited

U.S. PATENT DOCUMENTS

| | | |
|---|---|---|
| 2003/0212710 A1 | 11/2003 | Guy |
| 2003/0217170 A1 | 11/2003 | Nelson et al. |
| 2003/0219225 A1 | 11/2003 | Horii et al. |
| 2003/0220830 A1 | 11/2003 | Myr |
| 2003/0221167 A1 | 11/2003 | Goldstein et al. |
| 2003/0221541 A1 | 12/2003 | Platt |
| 2003/0222907 A1 | 12/2003 | Heikes et al. |
| 2003/0223411 A1 | 12/2003 | De La Fuente |
| 2003/0225834 A1 | 12/2003 | Lee et al. |
| 2003/0225848 A1 | 12/2003 | Heikes et al. |
| 2003/0228134 A1 | 12/2003 | Kim et al. |
| 2003/0229537 A1 | 12/2003 | Dunning et al. |
| 2003/0231188 A1 | 12/2003 | Cohen et al. |
| 2003/0233363 A1 | 12/2003 | Cohen et al. |
| 2003/0233379 A1 | 12/2003 | Cohen |
| 2003/0235402 A1 | 12/2003 | Seo et al. |
| 2003/0236582 A1 | 12/2003 | Zamir et al. |
| 2003/0236711 A1 | 12/2003 | Deguchi |
| 2003/0236832 A1 | 12/2003 | Mcintyre et al. |
| 2003/0236932 A1 | 12/2003 | Saito et al. |
| 2003/0237043 A1 | 12/2003 | Novak et al. |
| 2004/0002938 A1 | 1/2004 | Deguchi |
| 2004/0003046 A1 | 1/2004 | Grabelsky et al. |
| 2004/0003090 A1 | 1/2004 | Deeds |
| 2004/0003398 A1 | 1/2004 | Donian et al. |
| 2004/0003403 A1 | 1/2004 | Marsh |
| 2004/0003706 A1 | 1/2004 | Tagawa et al. |
| 2004/0008872 A1 | 1/2004 | Goldberg |
| 2004/0019497 A1 | 1/2004 | Volk et al. |
| 2004/0019658 A1 | 1/2004 | Plastina et al. |
| 2004/0024652 A1 | 2/2004 | Buhse et al. |
| 2004/0024886 A1 | 2/2004 | Saxena |
| 2004/0031058 A1 | 2/2004 | Reisman |
| 2004/0034582 A1 | 2/2004 | Gilliam et al. |
| 2004/0034849 A1 | 2/2004 | Cohen et al. |
| 2004/0041836 A1 | 3/2004 | Taner et al. |
| 2004/0049694 A1 | 3/2004 | Candelore |
| 2004/0055445 A1 | 3/2004 | Iyoku et al. |
| 2004/0056901 A1 | 3/2004 | March et al. |
| 2004/0057348 A1 | 3/2004 | Shteyn et al. |
| 2004/0057449 A1 | 3/2004 | Black |
| 2004/0064209 A1 | 4/2004 | Zhang |
| 2004/0064476 A1 | 4/2004 | Rounds |
| 2004/0064512 A1 | 4/2004 | Arora et al. |
| 2004/0064692 A1 | 4/2004 | Kahn et al. |
| 2004/0064832 A1 | 4/2004 | Tsukidate et al. |
| 2004/0068606 A1 | 4/2004 | Kim et al. |
| 2004/0070678 A1 | 4/2004 | Toyama et al. |
| 2004/0073427 A1 | 4/2004 | Moore |
| 2004/0075698 A1 | 4/2004 | Gao et al. |
| 2004/0078357 A1 | 4/2004 | LaChapelle et al. |
| 2004/0078383 A1 | 4/2004 | Merger et al. |
| 2004/0083273 A1 | 4/2004 | Madison et al. |
| 2004/0088348 A1 | 5/2004 | Yeager et al. |
| 2004/0103153 A1 | 5/2004 | Chang et al. |
| 2004/0109137 A1 | 6/2004 | Bubie et al. |
| 2004/0117442 A1 | 6/2004 | Thielen |
| 2004/0117455 A1 | 6/2004 | Kaminsky et al. |
| 2004/0117843 A1 | 6/2004 | Karaoguz et al. |
| 2004/0123725 A1 | 7/2004 | Kim |
| 2004/0128308 A1 | 7/2004 | Obrador |
| 2004/0128353 A1 | 7/2004 | Goodman et al. |
| 2004/0137882 A1 | 7/2004 | Forsyth |
| 2004/0143604 A1 | 7/2004 | Glenner et al. |
| 2004/0146275 A1 | 7/2004 | Takata et al. |
| 2004/0148353 A1 | 7/2004 | Karaoguz et al. |
| 2004/0148564 A1 | 7/2004 | Takata et al. |
| 2004/0162871 A1 | 8/2004 | Pabla et al. |
| 2004/0162878 A1 | 8/2004 | Lewis et al. |
| 2004/0165006 A1 | 8/2004 | Kirby et al. |
| 2004/0172456 A1 | 9/2004 | Green et al. |
| 2004/0174905 A1 | 9/2004 | Caspi et al. |
| 2004/0177115 A1 | 9/2004 | Hollander et al. |
| 2004/0177116 A1 | 9/2004 | McConn et al. |
| 2004/0177319 A1 | 9/2004 | Horn |
| 2004/0181487 A1 | 9/2004 | Hanson |
| 2004/0181517 A1 | 9/2004 | Jung et al. |
| 2004/0181540 A1 | 9/2004 | Jung et al. |
| 2004/0184778 A1 | 9/2004 | Jung et al. |
| 2004/0196315 A1 | 10/2004 | Swearingen et al. |
| 2004/0199387 A1 | 10/2004 | Wang et al. |
| 2004/0199471 A1 | 10/2004 | Hardjono |
| 2004/0199514 A1 | 10/2004 | Rosenblatt et al. |
| 2004/0199667 A1 | 10/2004 | Dobbins |
| 2004/0200261 A1 | 10/2004 | Shuman |
| 2004/0201609 A1 | 10/2004 | Obrador |
| 2004/0202335 A1 | 10/2004 | Lee et al. |
| 2004/0205028 A1 | 10/2004 | Verosub |
| 2004/0215718 A1 | 10/2004 | Kazmi et al. |
| 2004/0215731 A1 | 10/2004 | Tzann-En et al. |
| 2004/0220791 A1 | 11/2004 | Lamkin et al. |
| 2004/0220926 A1 | 11/2004 | Lamkin et al. |
| 2004/0221299 A1 | 11/2004 | Gibbs et al. |
| 2004/0221322 A1 | 11/2004 | Shen et al. |
| 2004/0223606 A1 | 11/2004 | Enete et al. |
| 2004/0224675 A1 | 11/2004 | Puskoor et al. |
| 2004/0226039 A1 | 11/2004 | Jung et al. |
| 2004/0228618 A1 | 11/2004 | Yoo et al. |
| 2004/0230672 A1 | 11/2004 | Zuckerberg et al. |
| 2004/0231003 A1 | 11/2004 | Cooper et al. |
| 2004/0236568 A1 | 11/2004 | Guillen et al. |
| 2004/0243592 A1 | 12/2004 | Bill |
| 2004/0252400 A1 | 12/2004 | Blank et al. |
| 2004/0252604 A1 | 12/2004 | Johnson et al. |
| 2004/0254669 A1 | 12/2004 | Badar |
| 2004/0254887 A1 | 12/2004 | Jacoby |
| 2004/0255330 A1 | 12/2004 | Logan |
| 2004/0260753 A1 | 12/2004 | Regan |
| 2004/0260761 A1 | 12/2004 | Leaute et al. |
| 2004/0260835 A1 | 12/2004 | Welk |
| 2004/0267552 A1 | 12/2004 | Gilliam et al. |
| 2004/0267812 A1 | 12/2004 | Harris et al. |
| 2005/0004985 A1 | 1/2005 | Stochosky |
| 2005/0004995 A1 | 1/2005 | Stochosky |
| 2005/0015389 A1 | 1/2005 | Novak et al. |
| 2005/0015713 A1 | 1/2005 | Plastina et al. |
| 2005/0015807 A1 | 1/2005 | Young |
| 2005/0021398 A1 | 1/2005 | McCleskey et al. |
| 2005/0021418 A1 | 1/2005 | Marcus et al. |
| 2005/0021470 A1 | 1/2005 | Martin et al. |
| 2005/0021678 A1 | 1/2005 | Simyon et al. |
| 2005/0021750 A1 | 1/2005 | Abrams |
| 2005/0027539 A1 | 2/2005 | Weber et al. |
| 2005/0027871 A1 | 2/2005 | Bradley et al. |
| 2005/0030937 A1 | 2/2005 | Wick et al. |
| 2005/0038707 A1 | 2/2005 | Roever et al. |
| 2005/0038724 A1 | 2/2005 | Roever et al. |
| 2005/0038794 A1 | 2/2005 | Piersol |
| 2005/0038814 A1 | 2/2005 | Iyengar et al. |
| 2005/0038819 A1 | 2/2005 | Hicken et al. |
| 2005/0038877 A1 | 2/2005 | Gupta et al. |
| 2005/0044229 A1 | 2/2005 | Brown et al. |
| 2005/0044574 A1 | 2/2005 | Lau et al. |
| 2005/0044893 A1 | 3/2005 | Coon et al. |
| 2005/0050446 A1 | 3/2005 | Miura et al. |
| 2005/0055472 A1 | 3/2005 | Krzyzanowski et al. |
| 2005/0060264 A1 | 3/2005 | Schrock et al. |
| 2005/0060350 A1 | 3/2005 | Baum et al. |
| 2005/0065912 A1 | 3/2005 | Cafrelli et al. |
| 2005/0065935 A1 | 3/2005 | Chebolu et al. |
| 2005/0071780 A1 | 3/2005 | Muller et al. |
| 2005/0076303 A1 | 4/2005 | Vaananen et al. |
| 2005/0076307 A1 | 4/2005 | Robbin |
| 2005/0080807 A1 | 4/2005 | Beilinson et al. |
| 2005/0086309 A1 | 4/2005 | Galli et al. |
| 2005/0086606 A1 | 4/2005 | Blennerhassett et al. |
| 2005/0091069 A1 | 4/2005 | Chuang |
| 2005/0091283 A1 | 4/2005 | Debique et al. |
| 2005/0091359 A1 | 4/2005 | Soin et al. |
| 2005/0091694 A1 | 4/2005 | Rambo |
| 2005/0096018 A1 | 5/2005 | White et al. |
| 2005/0097006 A1 | 5/2005 | Nyako |
| 2005/0102191 A1 | 5/2005 | Heller |
| 2005/0108176 A1 | 5/2005 | Jarol et al. |

(56) References Cited

U.S. PATENT DOCUMENTS

| | | |
|---|---|---|
| 2005/0108320 A1 | 5/2005 | Lord et al. |
| 2005/0108754 A1 | 5/2005 | Carhart et al. |
| 2005/0108770 A1 | 5/2005 | Karaoguz et al. |
| 2005/0114324 A1 | 5/2005 | Mayer |
| 2005/0114374 A1 | 5/2005 | Juszkiewicz et al. |
| 2005/0119976 A1 | 6/2005 | Taylor et al. |
| 2005/0122397 A1 | 6/2005 | Henson et al. |
| 2005/0123268 A1 | 6/2005 | Kawaguchi et al. |
| 2005/0131811 A1 | 6/2005 | Ranzini et al. |
| 2005/0132288 A1 | 6/2005 | Kirn et al. |
| 2005/0137984 A1 | 6/2005 | Nguyen et al. |
| 2005/0138543 A1 | 6/2005 | Liu |
| 2005/0144189 A1 | 6/2005 | Edwards et al. |
| 2005/0146996 A1 | 7/2005 | Roman |
| 2005/0149484 A1 | 7/2005 | Fox et al. |
| 2005/0149872 A1 | 7/2005 | Fong et al. |
| 2005/0154764 A1 | 7/2005 | Riegler et al. |
| 2005/0154988 A1 | 7/2005 | Proehl et al. |
| 2005/0160111 A1 | 7/2005 | Plastina et al. |
| 2005/0165795 A1 | 7/2005 | Myka et al. |
| 2005/0172001 A1 | 8/2005 | Zaner et al. |
| 2005/0177716 A1 | 8/2005 | Ginter et al. |
| 2005/0182855 A1 | 8/2005 | Apostolopoulos et al. |
| 2005/0192871 A1 | 9/2005 | Galuten et al. |
| 2005/0192904 A1 | 9/2005 | Candelore |
| 2005/0197906 A1 | 9/2005 | Kindig et al. |
| 2005/0197961 A1 | 9/2005 | Miller et al. |
| 2005/0198193 A1 | 9/2005 | Halme |
| 2005/0198317 A1 | 9/2005 | Byers |
| 2005/0209002 A1 | 9/2005 | Blythe et al. |
| 2005/0210396 A1 | 9/2005 | Galli |
| 2005/0210507 A1 | 9/2005 | Hawkins et al. |
| 2005/0216443 A1 | 9/2005 | Morton et al. |
| 2005/0216855 A1 | 9/2005 | Kopra et al. |
| 2005/0223170 A1 | 10/2005 | Ushijima et al. |
| 2005/0223329 A1 | 10/2005 | Schwartz et al. |
| 2005/0227676 A1 | 10/2005 | De Vries et al. |
| 2005/0228665 A1 | 10/2005 | Kobayashi et al. |
| 2005/0234875 A1 | 10/2005 | Auerbach et al. |
| 2005/0234995 A1 | 10/2005 | Plastina et al. |
| 2005/0240494 A1 | 10/2005 | Cue et al. |
| 2005/0240615 A1 | 10/2005 | Barsness et al. |
| 2005/0240661 A1 | 10/2005 | Heller et al. |
| 2005/0246651 A1 | 11/2005 | Krzanowski |
| 2005/0246662 A1 | 11/2005 | Torrey et al. |
| 2005/0251565 A1 | 11/2005 | Weel |
| 2005/0251566 A1 | 11/2005 | Weel |
| 2005/0251576 A1 | 11/2005 | Weel |
| 2005/0251807 A1 | 11/2005 | Weel |
| 2005/0262186 A1 | 11/2005 | Szeto et al. |
| 2005/0262204 A1 | 11/2005 | Szeto et al. |
| 2005/0262529 A1 | 11/2005 | Neogi et al. |
| 2005/0262989 A1 | 12/2005 | Franzblau |
| 2005/0273399 A1 | 12/2005 | Soma et al. |
| 2005/0276277 A1 | 12/2005 | Pace |
| 2005/0276570 A1 | 12/2005 | Reed |
| 2005/0286546 A1 | 12/2005 | Bassoli et al. |
| 2005/0288991 A1 | 12/2005 | Hubbard et al. |
| 2005/0289111 A1 | 12/2005 | Tribble et al. |
| 2006/0008256 A1 | 1/2006 | Khedouri et al. |
| 2006/0010240 A1 | 1/2006 | Chuah |
| 2006/0020662 A1 | 1/2006 | Robinson |
| 2006/0021065 A1 | 1/2006 | Kamperman et al. |
| 2006/0026634 A1 | 2/2006 | LaChapelle et al. |
| 2006/0031770 A1 | 2/2006 | McMenamin et al. |
| 2006/0039255 A1 | 2/2006 | Seo et al. |
| 2006/0040609 A1 | 2/2006 | Petschke et al. |
| 2006/0041627 A1 | 2/2006 | Tu |
| 2006/0041844 A1 | 2/2006 | Homiller |
| 2006/0053194 A1 | 3/2006 | Schneider et al. |
| 2006/0056324 A1 | 3/2006 | Hyyppa et al. |
| 2006/0080103 A1 | 4/2006 | Breemen |
| 2006/0085751 A1 | 4/2006 | O'Brien et al. |
| 2006/0088292 A1 | 4/2006 | Guillen et al. |
| 2006/0095502 A1 | 5/2006 | Lewis et al. |
| 2006/0095848 A1 | 5/2006 | Naik |
| 2006/0095852 A1 | 5/2006 | Trepess et al. |
| 2006/0100924 A1 | 5/2006 | Tevanian |
| 2006/0107297 A1 | 5/2006 | Toyama et al. |
| 2006/0122946 A1 | 6/2006 | Fahrny et al. |
| 2006/0123058 A1 | 6/2006 | Mercer et al. |
| 2006/0123113 A1 | 6/2006 | Friedman |
| 2006/0129533 A1 | 6/2006 | Purvis |
| 2006/0130117 A1 | 6/2006 | Lee et al. |
| 2006/0133768 A1 | 6/2006 | Ellis |
| 2006/0143084 A1 | 6/2006 | Donnelli et al. |
| 2006/0143236 A1 | 6/2006 | Wu |
| 2006/0156239 A1 | 7/2006 | Jobs et al. |
| 2006/0161635 A1 | 7/2006 | Lamkin et al. |
| 2006/0167804 A1 | 7/2006 | Aydar |
| 2006/0167807 A1 | 7/2006 | Aydar et al. |
| 2006/0167985 A1 | 7/2006 | Albanese et al. |
| 2006/0167991 A1 | 7/2006 | Heikes et al. |
| 2006/0168340 A1 | 7/2006 | Heller et al. |
| 2006/0170759 A1 | 8/2006 | Roever et al. |
| 2006/0173825 A1 | 8/2006 | Hess et al. |
| 2006/0173838 A1 | 8/2006 | Garg et al. |
| 2006/0173974 A1 | 8/2006 | Tang |
| 2006/0174008 A1 | 8/2006 | Abanami |
| 2006/0190410 A1 | 8/2006 | Harper |
| 2006/0190616 A1 | 8/2006 | Mayerhofer et al. |
| 2006/0195403 A1 | 8/2006 | New et al. |
| 2006/0195462 A1 | 8/2006 | Rogers |
| 2006/0195512 A1 | 8/2006 | Rogers et al. |
| 2006/0195513 A1 | 8/2006 | Rogers et al. |
| 2006/0195521 A1 | 8/2006 | New et al. |
| 2006/0195789 A1 | 8/2006 | Rogers et al. |
| 2006/0195790 A1 | 8/2006 | Beaupre et al. |
| 2006/0212541 A1 | 9/2006 | Ueshima et al. |
| 2006/0218195 A1 | 9/2006 | LaChapelle et al. |
| 2006/0239131 A1 | 10/2006 | Nathan et al. |
| 2006/0242073 A1 | 10/2006 | Padawer et al. |
| 2006/0242259 A1 | 10/2006 | Vallabh |
| 2006/0265421 A1 | 11/2006 | Ranasinghe et al. |
| 2006/0268667 A1 | 11/2006 | Jellison et al. |
| 2006/0271794 A1 | 11/2006 | Nonaka et al. |
| 2006/0282858 A1 | 12/2006 | Csicsatka |
| 2006/0294571 A1 | 12/2006 | Moore et al. |
| 2007/0005422 A1 | 1/2007 | Levien et al. |
| 2007/0005423 A1 | 1/2007 | Levien et al. |
| 2007/0005651 A1 | 1/2007 | Levien et al. |
| 2007/0005653 A1 | 1/2007 | Marsh |
| 2007/0006099 A1 | 1/2007 | Johnson et al. |
| 2007/0011206 A1 | 1/2007 | Gupta et al. |
| 2007/0016599 A1 | 1/2007 | Plastina et al. |
| 2007/0016865 A1 | 1/2007 | Johnson et al. |
| 2007/0044137 A1 | 2/2007 | Bennett et al. |
| 2007/0050409 A1 | 3/2007 | Bugir et al. |
| 2007/0050413 A1 | 3/2007 | Kominek et al. |
| 2007/0067427 A1 | 3/2007 | Bugir et al. |
| 2007/0073596 A1 | 3/2007 | Alexander et al. |
| 2007/0074118 A1 | 3/2007 | Robbin et al. |
| 2007/0074619 A1 | 4/2007 | Vergo |
| 2007/0078777 A1 | 4/2007 | Demartini et al. |
| 2007/0078896 A1 | 4/2007 | Hayashi et al. |
| 2007/0083380 A1 | 4/2007 | Martinez |
| 2007/0083558 A1 | 4/2007 | Martinez |
| 2007/0083762 A1 | 4/2007 | Martinez |
| 2007/0094139 A1 | 4/2007 | Martinez |
| 2007/0124680 A1 | 5/2007 | Robbin et al. |
| 2007/0130544 A1 | 6/2007 | Kim et al. |
| 2007/0136240 A1 | 6/2007 | Wang et al. |
| 2007/0143365 A1 | 6/2007 | D'Souza et al. |
| 2007/0143740 A1 | 6/2007 | Hoerentrup |
| 2007/0150499 A1 | 6/2007 | D'Souza et al. |
| 2007/0156792 A1 | 7/2007 | D'Souza et al. |
| 2007/0156793 A1 | 7/2007 | D'Souza et al. |
| 2007/0159934 A1 | 7/2007 | Weon |
| 2007/0162502 A1 | 7/2007 | Thomas et al. |
| 2007/0174321 A1 | 7/2007 | Viikari et al. |
| 2007/0191108 A1 | 8/2007 | Brunet De Courssou et al. |
| 2007/0198363 A1 | 8/2007 | Quoc et al. |
| 2007/0198364 A1 | 8/2007 | Quoc et al. |
| 2007/0198426 A1 | 8/2007 | Yates |

(56) References Cited

U.S. PATENT DOCUMENTS

| | | |
|---|---|---|
| 2007/0203984 A2 | 8/2007 | Alhusseini et al. |
| 2007/0226365 A1 | 9/2007 | Hildreth et al. |
| 2007/0247979 A1 | 10/2007 | Brillon et al. |
| 2007/0263865 A1 | 11/2007 | Cohen et al. |
| 2007/0266049 A1 | 11/2007 | Cohen et al. |
| 2007/0271184 A1 | 11/2007 | Niebert et al. |
| 2007/0274519 A1 | 11/2007 | Cohen et al. |
| 2007/0276757 A1 | 11/2007 | Cohen et al. |
| 2007/0294295 A1 | 12/2007 | Finkelstein et al. |
| 2007/0294305 A1 | 12/2007 | Cohen et al. |
| 2007/0294720 A1 | 12/2007 | Cohen et al. |
| 2007/0299877 A1 | 12/2007 | Cohen et al. |
| 2008/0010083 A1 | 1/2008 | Cohen et al. |
| 2008/0013859 A1 | 1/2008 | Cohen et al. |
| 2008/0027747 A1 | 1/2008 | McGovern et al. |
| 2008/0027909 A1 | 1/2008 | Gang et al. |
| 2008/0028422 A1 | 1/2008 | Cohen et al. |
| 2008/0033979 A1 | 2/2008 | Vignoli et al. |
| 2008/0046439 A1 | 2/2008 | Miller et al. |
| 2008/0052104 A1 | 2/2008 | Cohen et al. |
| 2008/0052161 A1 | 2/2008 | Cohen et al. |
| 2008/0059530 A1 | 3/2008 | Cohen et al. |
| 2008/0077954 A1 | 3/2008 | Cohen et al. |
| 2008/0086379 A1 | 4/2008 | Dion et al. |
| 2008/0086380 A1 | 4/2008 | Cohen et al. |
| 2008/0092168 A1 | 4/2008 | Logan et al. |
| 2008/0133576 A1 | 6/2008 | Hempleman et al. |
| 2008/0162641 A1 | 7/2008 | Chandra et al. |
| 2008/0178238 A1 | 7/2008 | Khedouri et al. |
| 2008/0193101 A1 | 8/2008 | Agnihotri et al. |
| 2008/0201299 A1 | 8/2008 | Lehikoinen et al. |
| 2008/0209231 A1 | 8/2008 | Kim et al. |
| 2008/0215882 A1 | 9/2008 | Coldicott et al. |
| 2008/0229399 A1 | 9/2008 | O'Neil et al. |
| 2008/0235142 A1 | 9/2008 | Gonze et al. |
| 2008/0269931 A1 | 10/2008 | Martinez |
| 2008/0313233 A1 | 12/2008 | Cohen et al. |
| 2009/0024619 A1 | 1/2009 | Dallmeier et al. |
| 2009/0037243 A1 | 2/2009 | Cohen et al. |
| 2009/0037278 A1 | 2/2009 | Cohen et al. |
| 2009/0070213 A1 | 3/2009 | Miller et al. |
| 2009/0106696 A1 | 4/2009 | Duarte |
| 2009/0138484 A1 | 5/2009 | Ramos et al. |
| 2009/0150199 A1 | 6/2009 | Cohen et al. |
| 2009/0150444 A1 | 6/2009 | Cohen et al. |
| 2009/0151004 A1 | 6/2009 | Cohen et al. |
| 2009/0151008 A1 | 6/2009 | Cohen et al. |
| 2009/0158155 A1 | 6/2009 | Quinn et al. |
| 2009/0177654 A1 | 7/2009 | Beaupre et al. |
| 2009/0204475 A1 | 8/2009 | Cohen et al. |
| 2009/0210946 A1 | 8/2009 | Cohen et al. |
| 2009/0217343 A1 | 8/2009 | Bellwood et al. |
| 2009/0235364 A1 | 9/2009 | Cohen et al. |
| 2009/0259623 A1 | 10/2009 | Mooneyham et al. |
| 2009/0300480 A1 | 12/2009 | Cohen et al. |
| 2009/0307201 A1 | 12/2009 | Dunning et al. |
| 2010/0008500 A1 | 1/2010 | Lisanke et al. |
| 2010/0017885 A1 | 1/2010 | Cohen et al. |
| 2010/0154065 A1 | 6/2010 | Cohen et al. |
| 2010/0172540 A1 | 7/2010 | Davis et al. |
| 2010/0185306 A1 | 7/2010 | Rhoads |
| 2010/0205166 A1 | 8/2010 | Boulter et al. |
| 2010/0321519 A1 | 12/2010 | Bill |
| 2011/0185042 A1 | 7/2011 | Wohlert et al. |
| 2011/0235801 A1 | 9/2011 | Peterka et al. |
| 2011/0239280 A1 | 9/2011 | Chandra et al. |
| 2011/0247077 A1 | 10/2011 | Nguyen et al. |
| 2011/0271116 A1 | 11/2011 | Martinez |
| 2011/0307832 A1 | 12/2011 | Audet |
| 2011/0317985 A1 | 12/2011 | Black |
| 2012/0011592 A1 | 1/2012 | Loeytynoja et al. |
| 2012/0087637 A1 | 4/2012 | Logan et al. |
| 2012/0331386 A1 | 12/2012 | Hicken et al. |
| 2013/0055408 A1 | 2/2013 | Hall et al. |
| 2013/0173656 A1 | 7/2013 | Spiegelman et al. |
| 2013/0179949 A1 | 7/2013 | Shapiro |
| 2014/0002462 A1 | 1/2014 | Jiang et al. |
| 2014/0310407 A1 | 10/2014 | Zhang et al. |
| 2017/0064408 A1 | 3/2017 | Ketola et al. |

FOREIGN PATENT DOCUMENTS

| | | | |
|---|---|---|---|
| EP | 1548740 | A2 | 6/2005 |
| JP | 2000020434 | A | 1/2001 |
| JP | 2001022844 | A | 1/2001 |
| JP | 2001160003 | A | 6/2001 |
| JP | 2001515617 | A | 9/2001 |
| JP | 2001527668 | A | 12/2001 |
| JP | 2002133147 | A | 5/2002 |
| JP | 2003006364 | A | 1/2003 |
| JP | 2003233690 | A | 8/2003 |
| JP | 2004005309 | A | 1/2004 |
| KR | 20011175272 | A1 | 8/2001 |
| WO | 0054187 | A1 | 9/2000 |
| WO | 0233579 | A1 | 4/2002 |
| WO | 02071678 | A2 | 9/2002 |
| WO | 2004046874 | A2 | 6/2004 |
| WO | 2005071569 | A1 | 8/2005 |

OTHER PUBLICATIONS

Epema, D. H. J., et al. "Music2Share—Copyright-Compliant Music Sharing in P2P Systems" Proceedings of The IEEE, col. 92, No. 6; Jun. 1, 2004; pp. 961-970.

Guterman, Jimmy: "Will AOL Tame Aimster?-file sharing system piggyback's on AOL instant messaging-Company Business and Marketing"; [Online] XP002532806; Dec. 18, 2000; Retrieved from the Internet http://findarticles.com/articles/mi_mOHWW/is_51_3/ai_68156086/ retrieved on Jun. 18, 2009; 3 pages.

Yang B et al; "Comparing Hybrid peer-to-peer systems" Proceedings of the 27th VLDB Conference, Roma, Italy; Sep. 11, 2001; pp. 561-570.

Stauffer. "How to do everything with iTunes for Macintosh and Windows." Published Feb. 27, 2004, 11 pages.

MAC Observer, "iTunes 4 Tip—Sharing iTunes libraries over IP; It's not just for Rendezvous," Published Apr. 29, 2003, to MacObserver.com, 2 pages.

Lienhart, Rainer, et al., "Improving Media Services on P2P Networks," IEEE Internet Computing, Jan.-Feb. 2002, pp. 73-77.

Macedonia, Michael, "Distributed File Sharing: Barbarians at the Gates?", Computer, vol. 33, No. 8, Aug. 2000, pp. 99-101.C.

Swierk, Edward, et al., "The Roma Personal Metadata Services", Mobile Networks and Applications, vol. 7, No. 5, Oct. 2002, pp. 407-418.

Qian, Yuechen, et al., "Exploring the Potentials of Combing Photo Annotating Tasks with Instant Messaging Fun", MUM 2004, College Park, MD, Oct. 27-29, 2005, pp. 11-17.

Regan, Tim, et al., "Media Center Buddies: Instant Messaging Around a Media Center", NordiCHI "04, Tampere, Finland, Oct. 23-27, 2004, pp. 141-144.

Gottesman, Ben Z., "IM Your Photos", PCMag.com, Dec. 11, 2003, pp. 1-2 (downloaded from:www.pcmag.com/printarticle2/0,1217,a=114405,OO.asp.

Bassoli, Arianna, et al., "TunA: A Mobile Music Experience to Foster Local Interatctions", UbiComp 2003, Seattle, WA, Oct. 12-15, 2003, pp. 1-2.

Grinter, Rebecca E., et al., "Instant Messaging in Teen Life", CSCW"02, New Orleans, LA, Nov. 16-20, 2002, pp. 21-30.

Qian, Yuechen, et al., "Turning Photo Annotating Tasks into Instant Messaging Fun: Prototyping, User Trials and Roadmapping", ICEC 2004, LCNS 3166, vol. 3166/2004, Springer, Berlin, Aug. 4, 2004, pp. 610-613.

Coursey, David, "My Favorite Ways to Share Digital Photos", ZDNet, Nov. 7, 2003, pp. 1-3. (downloaded from:review.zdnet.com/AnchorDesk/4520-7298_16-5103567.html).

Bolcer, Gregory Alan., "Magi: An Architecture for Mobile and Disconnected Workflow", IEEE Internet Computing, vol. 1, Issue 3, May/Jun. 2000, pp. 46-54.

(56) References Cited

OTHER PUBLICATIONS

Dunn, Jon W., et al., "Variations: A Digital Music Library System at Indiana University", DL 99, Berkeley, CA, 1999, pp. 12-19.
Rajani, Rakhi E., et al., "Viewing and Annotating Media with MemoryNet", CHI 2004, Vienna, Austria, Apr. 24-29, 2004, pp. 1517-1520.
Microsoft Computer Dictionary, 4th Edition, Microsoft Press, Redmond, Wa, 1999, p. 348.
David Bainbridge, Sall Jo Cunningham, and J. Stephen Downie—"Visual Collaging of Music in a Digital Library" http://hdl.handle.net/10289/43—In Proceedings: Fifth International Conference on Music Information Retrieval. ISMIR 2004: Oct. 10-14, 2004, Barcelona, Spain, (c) 2004 Universitat Pompeu Fabra n—(pp. 1-6).
Mark van Setten and Erik Ottmans—"Demonstration of A Distributed MPEG-7 Video Search and Retrieval Application in the Educational Domain"—Proceeding MULTIMEDIA "01 Proceedings of the ninth ACM international conference on Multimedia 2001 ACM Sep.-Oct. 5, 2001, Ottawa, Canada—(pp. 595-596).
XSPF: XML Shareable Playlist Format: Specifications—The XSPF Playlist Format, version 0, xspf.org/specs, May 2004, 14 pages.
XSPF: XML Shareable Playlist Format: Applications—Yahoo! Music Jukebox (Windows), xspf.org/spplications, donloaded Apr. 13, 2011, 7 pages.
Drucker, Steven M., et al., MediaBrowser: Reclaiming the Shoebox, AVI '04, Gallipoli, Italy, May 25-28, 2004, pp. 433-436.
Hayes, Conor, et al., "Context Boosting Collaborative Recommendation", Knowledge-Based Systems, vol. 17, Issues 2-4, May 2004, pp. 131-138.
Pachet, Francois, et al., "Content Management for Electronic Music Distribution", Communications of the ACM, vol. 46, No 4, Apr. 2003, pp. 71-75.
Tzanetakis, George, "Musescape: A Tool for Changing Music Collections into Libraries", ECDL 2003, LNCS 2769, Springer-Verlag, Berlin, Feb. 26, 2004, pp. 412-421.
Pfeiffer, Silvia, et al., ""Annodex: A Simple Architecture to Enable Hyperlinking, SearchandRetrieval of Time-Continuous Data on the Web"", MIR"03, Berkeley, CA, Nov. 7, 2003, pp. 87-93.
Cano, Pedro, et al., "MTG-DB: A Repository for Music Audio Processing", WEDELMUSIC "04, Sep. 13-14, 2004, pp. 2-9.
Vinet, Hugues, et al., "The CUIDADO Project", IRCAM, 2002, pp. 1-7.
Bayardo, Roberto J., et al., "Peer-to-Peer Sharing of Web Applications", WWW 2003, Budapest, Hungary, May 20-24, 2003, pp. 1-2.
Microsoft Computer Dictionary, 5th Edition, Microsoft Press Redmond WA, 2002, pp. 19, 410, 539 and 542.
Torrens, Marc, et al., "Visualizing and Exploring Music Libraries", Universitat Pompeu Fabra, 2004, pp. 1-8.
Maniar, Nipan, et al., "Dynamic Streaming Media—Creating Custom Programmes in Real-time", ACE '04, Singapore, Jun. 3-5, 2004, pp. 349.
Gradman, Eric, "Distributed Social Software", Dec. 12, 2003, pp. 1-10.
Pachet, Francois, et al., "Popular Music Access: The Sony Music Browser", Journal of the American Society for Information Science and Technology, vol. 55, Issue 12, May 13, 2004, pp. 1037-1044.
Wolz, Ursula, et al., "r-Music, A Collaborative Music DJ and Ad Hoc Networks", wedelmusic "04, Sep. 13-14, 2004, pp. 144-150.
Liu, Qiong, et al., "Digital Rights Managemetn for Content Distribution", Proc. Of the Australasian Information Security Workshop, Conf. on ACSW Frontiers 2003, vol. 21, Adelaide, Australia, 2003, pp. 49-58.
Crossen, Andrew, et al., "Flytrap: Intelligent Group Music Recommendation", RIDE-VE '99, Sydney, Australia, Mar. 23-24, 1999, pp. 148-155.
Hauver, David B., et al., "Flycasting: Using Collaborative Filtering to Generate a Playlist for Online Radio", WEDELMUSIC"01, Nov. 23-24, 2001, pp. 123-130.
Ku, William, et al., "Survey on the Technological Aspects of Digital Rights Management", ISC 2004, LNCS 3225, Springer Berlin, Sep. 21, 2004, pp. 391-403.

Liang, Qianhui, et al., "A United Approach to Discover Multimedia Web Services", ISMSE "03, Dec. 10-12, 2003, pp. 62-69.
Microsoft Computer Dictionary, 4th Edition, Microsoft Press, Redmond, WA, 1999, pp. 348 and 461.
Mclean et al. ("Interoperability between information and Learning Enviroments—Bridging the Gaps, A Joint White Paper on behalf of the IMS Global Learning Consortium and the Coalition for Networked Information", Jun. 28, 2003, 13 pages).
Lundgren, Henrik, et al., "A Distributed Instant Messaging Architecture Based on the Pastry Peer-to-Peer Routing Substrate", SNCNW 2003, 2003, pp. 1-3.
Bassoli, Andrea, et al., "tuna: Local Music Sharing with Handheld Wi-Fi Device" Proc. Of the 5th Wireless Worid Conf., 2004, pp. 1-23.
Aberer, Karl, "P-Grid: A Self-Organizing Access Structure for P2P Information System", CoopIS 2001, LNCS 2172, Springer-Verlag, Berlin Germany, 2001, pp. 179-194.
Mei, Hsing, et al., "PP-COSE: A P2P Community Search Scheme", CIT "04, Sep. 14-16, 2005, pp. 1-8.
Isaacs, Ellen, et al., "Mobile Instant Messaging Through Hubbub", Communications of the ACM. vol. 45, Issue 9, Sep. 2002, pp. 68-72.
"Winamp 5.666 Full Version : Download Software," retrieved from:http://radioarpan.blogspot.com/2014/12/winamp-5666-full-version-download.html, Apr. 9, 2020, 5 pages.
"How to Configure a Shared Folder (Windows 98/Me) (MF4680)," retrieved from: Jan. 30, 2012, 8 pages.
"Organize Your Digital Media Collection," retrieved from: http://www.pcdigitalhome.co.uk/music/organize.htm, Apr. 9, 2020, 3 pages.
"Winamp 5.6 Publisher Description," retrieved from: https://winamp.soft112.com/description.html, Apr. 9, 2020, 5 pages.
Shimpi, A., "Microsoft"s Portable Media Center Devices:Exposed," retrieved from: https://www.anandtech.com/show/1489, Sep. 27, 2004, 3 pages.
Thomas Shinder MCSE, "Create and control shared folders in Windows XP," retrieved from: https://www.techrepublic.com/article/create-and-control-shared-folders-in-windows-xp/, Jul. 15, 2002, 19 pages.
"Winamp Review," retrieved from: https://www.slant.co/options/1428/~winamp-review on Apr. 9, 2020, Slant, 7 pages.
"Gnutella Forums—View Single Post—Windows Media Player 10 Guide_ Adding Songs to Your Library and Burning CDs," retrieved from: http://www.gnutellaforums.com/344530-post27.html, Jun. 30, 2004, 2 pages.
Counts, S., et al., "Supporting Social Presence through Lightweight Photo Sharing On and Off the Desktop," CHI 2004, Apr. 24, 2004, XP055797694, 7 pages.
Bach, Erik, et al., "Bubbles: Navigating Multimedia Content in Mobile Ad-hoc Networks", ACM 1-58113-826-1/03/12, 2003, pp. 73-80.
Milojicic, Dejan S., et al. "Peer-to-Peer Computing", HPL-2002-57, 2002, pp. I and 1-51.
Moore, Julian, "tuna: Shared Audio Experience", Masters Thesis, University of Limerick, Sep. 2004, pp. i-x and 1-100.
Kawarasaki, Masatoshi, et al. "Metadata Associated Network Services and Capabilities", Proc. Int. Conf. on Dublin Dore and Metadata for e-Communities, Firenze University Press, 2002, pp. 225-227.
Good, Nathaniel S., et al., "Usability and Privacy: A study of KaZaA P2P File-Sharing", CHI 2003, Ft. Lauderdale, FL, vol. 5, No. 1, Apr. 5-10, 2003, pp. 137-144.
Hjelsvold Rune, et al., "Web-Based Personalization and Management of Interactive Video", WWW 10, Hong Kong, May 1-5, 2001, pp. 129-139.
Lee, Kyung Hee, et al., "Requirements and Referential Software Architecture for home Server based Inter-Home Multimedia Collaboration Services", IEEE transactions on Consumer Electronics, vol. 50, No. 1, Feb. 2004, pp. 145-150.
Haneef, Anwar M., et al., "ANMoLe—An Adaptive Mltimedia Content Deliver Middleware Architecture for Heterogeneous Mobile Multi Device Neighborhoods", Multimedia Tools and Applications, vol. 22, No. 2, Feb. 2004, pp. 171-186.

(56) References Cited

OTHER PUBLICATIONS

Swain, Michael J., "Searching for Multimedia on the World Wide Web", IEEE Conf. on Multimedia Computing and Systems, vol. 1Jun. 7-11. 1999, pp. 32-37.
Yi, B.K. Subramanya, S.R.—"Enhancing personal communications with multimedia"—Browse JournalsandMagazines>Computer>vol. 37, Issue:6—Date of Publication: Jun. 21, 2004—pp. 79-81.
John Zimmerman—Carnegie Mellon University, Pittsburgh, PA—"Exploring the role of emotion in the interaction design of digital music players"—Proceeding DPPI "03 Proceedings of the 2003 international conference on Designing pleasurable products and interfaces—Jun. 23-26, 2003—pp. 152-153.
Imad M Abbadi, Chris J. Mitchell, "Digital rights management using a mobile phone", Aug. 2007, ICEC"07: Proceedings of the ninth international conference on Electronic commerce, Publisher: ACM, pp. 185-194.
Miser et al, "iPod+iTunes Starter Kit", published by Que, First printing, Oct. 2004, copyright 2005 Que Publishing.
Davies, Nigel, et al., "Supporting Adaptive Video Applications in Mobile Environments", IEEE Communications Magazine, vol. 36, Issue 6, Jun. 1998, pp. 138-143.
Richard Griscom, "Distant Music: Delivering Audio over the Internet" Published in Notes, vol. 59, No. 3, Mar. 2003, total 23 pages.
"New Rhapsody Lets Consumers Listen to and Share Music for Free, Legally", Seattle, Apr. 26 /PRNewswire-FirstCall/,printed out by Nov. 27, 2014, total 5 pages.
EPO: "Notice from the European Patent Office dated Oct. 1, 2007 concerning business methods", Official Journal of the European Patent Office, vol. 30, No. 11, Nov. 1, 2007, pp. 592-593, total 2 pages.
Foreign Communication From A Counterpart Application, European Application No. EP 06736092, Supplementary European Search Report dated Aug. 20, 2009, 3 pages.
Foreign Communication From A Counterpart Application, European Application No. EP 06736090, Supplementary European Search Report dated Jun. 18, 2009, 4 pages.
Foreign Communication From A Counterpart Application, European Application No. EP 06815840, Supplementary European Search Report dated Sep. 2, 2009, 2 pages.
Foreign Communication From A Counterpart Application, PCT Application No. PCT/US2006/006440, International Preliminary Report on Patentability dated Sep. 25, 2007, 5 pages.
Foreign Communication From A Counterpart Application, PCT Application No. PCT/US2006/006934, International Preliminary Report on Patentability dated Sep. 11, 2007, 4 pages.
Foreign Communication From A Counterpart Application, PCT Application No. PCT/US2006/006932, International Preliminary Report on Patentability dated Mar. 17, 2009, 7 pages.
Foreign Communication From A Counterpart Application, PCT Application No. PCT/US06/06683, International Search Report and Written Opinion dated Oct. 19, 2007, 8 pages.
Foreign Communication From A Counterpart Application, PCT Application No. PCT/US2006/006687, Notification Concerning Submission or Transmittal of Priority Document dated Jul. 20, 2006, 1 page.
Foreign Communication From A Counterpart Application, PCT Application No. PCT/US06/06685, International Search Report dated Feb. 11, 2008, 5 pages.
Foreign Communication From A Counterpart Application, PCT Application No. PCT/US06/07124, International Search Report dated Dec. 5, 2007, 6 pages.
Foreign Communication From A Counterpart Application, PCT Application No. PCT/US06/006440, International Search Report dated Aug. 8, 2007, 5 pages.

* cited by examiner

| | Level of Authorization, Dependent on Media File Format | | | |
|---|---|---|---|---|
| Requesting Computing Device | Sharing Computing Device | Streaming | Tethered Download | Downloaded / Purchased | Non-DRM |
| No subscription to online media service. 1205 | Subscription to online media service. 1210 | The requesting device can only play a portion of the media file or may be denied all access. 1215 | The requesting device can only play a portion of the media file. Or, the requesting device can request the sharing device to sign into the online service under the sharing device's subscription id. Then, the requesting device has full access via the sharing device. 1220 | The requesting device has full access provided the sharing device had access. Or, the requesting device can request the sharing device to sign into the online service under the sharing device's subscription id. Then, the requesting device has full access. 1225 | The requesting device has full access. 1230 |
| Subscription to an online media service. 1235 | Subscription to online media service. 1240 | The requesting device has full access to the media files. 1245 | The requesting device has full access to the media files. 1250 | The requesting device has full access to the media files. 1255 | The requesting device has full access to the media files. 1260 |

FIG. 12

METHOD FOR SHARING AND SEARCHING PLAYLISTS

CROSS-REFERENCE TO RELATED APPLICATIONS

This application is a continuation application of U.S. patent application Ser. No. 15/074,760, filed on Mar. 18, 2016, which is a continuation application of U.S. patent application Ser. No. 14/092,479, filed on Nov. 27, 2013, which is a continuation application of U.S. patent application Ser. No. 11/315,989, filed on Dec. 21, 2005, now U.S. Pat. No. 8,601,572. U.S. patent application Ser. No. 11/315,989 claims priority of U.S. Provisional Application No. 60/657,222, filed Feb. 28, 2005, and U.S. Provisional Application No. 60/678,718, filed May 5, 2005. All of the aforementioned patent applications are incorporated herein by reference in their entireties.

BACKGROUND

The expansion of the Internet and the World Wide Web ("web") has given computer users the enhanced ability to listen to and to watch various different forms of media from various sources through their computers. This media can be in the form of audio music, music videos, and television programs, sporting events or any other form of audio or video media that a user wishes to watch or listen to. As time evolved, users were able to take the music that was on that compact disc, store it on their computers, and listen to it locally. Further, online media sources were developed, which allowed users to acquire thousands of media files. Typically, these online media sources employ digital rights management (DRM) to restrict the usage of media files purchased and downloaded online. Additionally, systems were developed which allowed users in a network environment to share their media collection with other networked computing devices. However, the current systems are not capable of supporting the access and playback of a comprehensive set of media files with several types of associated DRM such as streaming media files, tethered downloads, and/or purchased downloads. Thus, what is lacking in each of the currently available systems is a system in which all types of media files, regardless of their associated DRM or rights, are available for viewing and playback on a computing device, in one aspect, in a network environment.

SUMMARY

The present disclosure addresses the above identified deficiencies in the current art. In one aspect, the present disclosure provides for the accessing and playing of media files having differing associated rights such as non-DRM media files, purchased and downloaded media files, subscription download files such as tethered downloads, and subscription streamed DRM files. In one embodiment, the present disclosure provides a method and user interface for sharing a media collection among computing devices in communication via a network. In one embodiment, the disclosed method allows access and playback, from each computing device on a network, of all media files in a media collection, regardless of their associated rights.

In one embodiment, the present disclosure provides for a method of sharing a media collection among computing devices in communication via a network, the method comprising requesting, from a first computing device operated by a first subscriber, access to a media collection associated with a second subscriber on a second computing device, the first and second computing devices being capable of communication via the network, the first subscriber associated with a first level of authorization to interact with an online media service, and the second subscriber associated with a second level of authorization to interact with the online media service; receiving, at the first computing device, a set of media file identifiers from the second computing device, each identifier associated with a respective media file of the media collection; displaying at least a portion of the set of identifiers; and making the respective media files available for being experienced on the first computing device according to a set of rules and the first level and the second level of authorization, the respective media files capable of being acquired from a source either by streaming the respective media file from the source or downloading the respective media file as a tethered download from the source.

In one embodiment, the set of rules comprises analyzing a user's level of authorization to interact with the online media service.

In one embodiment, the respective media files are available for being experienced on the first computing device if the first level of authorization matches the predetermined level of authorization. In another embodiment, the respective media files are prevented from being experienced on the first computing device if the first level of authorization does not match the predetermined level of authorization. In another embodiment, the first level and the second level of authorization are the same level. In another embodiment, the respective media files are available for being experienced on the first computing device if the first level of authorization matches the second level of authorization. In another embodiment, the respective media files are prevented from being experienced on the first computing device if the first level of authorization does not match the second level of authorization. In another embodiment, either one or both of the first level of authorization and the second level of authorization is associated with full access to all media files of the online media service. In another embodiment, either one or both of the first level of authorization and the second level of authorization is associated with full access to all tethered media file downloads of the online media service. In another embodiment, either one or both of the first level of authorization and the second level of authorization is associated with full access to all streaming media files of the online media service. In another embodiment, either one or both of the first level of authorization and the second level of authorization is associated with preventing access to all media files of the online media service. In another embodiment, either one or both of the first level of authorization and the second level of authorization is associated with allowing access to a portion of media files of the online media service. In another embodiment, the first level of authorization and the second level of authorization are similar or dissimilar.

In one embodiment, the set of rules permit the media files to be played by the first computing device if the first level of authorization and the second level of authorization are both associated with a subscription to the online media service. In another embodiment, the set of rules prevent the media files from being streamed to the first computing device if the second level of authorization is associated with a subscription to the online media service and the first level of authorization is not associated with the subscription. In another embodiment, the set of rules prevent the media files from being downloaded to the first computing device if the second level of authorization is associated with a subscription to the online media service and the first level of authorization is not associated with the subscription.

In one embodiment, the network is the internet or is a local area network. In another embodiment, the network is constrained by the number of computing devices connected to the network.

In one embodiment, the media file identifier comprises a pointer to the respective media file, a uniform resource locator and/or a universal resource identifier.

In one embodiment, the source comprises a server, the second computing device, and/or a plurality of sources. In another embodiment, the sources may be different. In another embodiment, the source comprises a first source if the respective media file is acquired by streaming the respective media file, and the source comprises a second source if the respective media file is downloaded as a tethered download.

In one embodiment, either one or both of the first computing device and the second computing device is a personal computer.

In one embodiment, the media collection comprises at least one media file, which may be an audio file, video file, and/or playlist.

In one embodiment, the method of sharing a media collection among computing devices in communication via a network further comprises receiving, from the second subscriber, a setting associated with sharing the media collection. In one embodiment, the setting comprises user-entered text representing a name of the second computing device as it appears to the first computing device, permitting the second computing device to stream media files to the first computing device, and/or permitting the first computing device to only browse media files associated with the second computing device.

In one embodiment, the method of sharing a media collection among computing devices in communication via a network further comprises receiving, from the second subscriber, a preference associated with sharing the media collection. In one embodiment, the preference comprises permitting the entire media collection to be shared with the first computing device, permitting only a portion of media collection to be shared with the first computing device, permitting all playlists associated with the second subscriber to be shared with the first computing device, permitting only playlists designated as public by the second subscriber to be shared with the first computing device, permitting only user-selected playlists associated with the second subscriber to be shared with the first computing device, and/or preventing all playlists associated with the second subscriber to be shared with the first computing device.

BRIEF DESCRIPTION OF THE DRAWINGS

The following drawing figures, which form a part of this application, are illustrative of embodiments of the present disclosure and are not meant to limit the scope of the disclosure in any manner, which scope shall be based on the claims appended hereto.

FIG. 12 is an exemplary set of rules according to one exemplary embodiment.

DETAILED DESCRIPTION

In one embodiment, the present disclosure provides a method and user interface for sharing a media collection among computing devices in communication via a network. In one embodiment, the disclosed method allows access and playback, from each computing device on a network, of all media files in a media collection, regardless of their associated rights. In one embodiment, the media files available within a network are from an online media service and thus are streamed or downloaded as a tethered download. In a further embodiment, the present disclosure provides a method and user interface for sharing a media collection among a computing device and a network enabled device in communication via a network.

As used herein, the term network can encompass any type or size of network, such as the internet or a home, corporate, or local area networking environment, whether local or wireless. Further, in one embodiment, the term computing device refers to any device capable of recognizing a unique token. In one embodiment, a unique token may be associated with a user or member id unique to an online media service or online community. In one embodiment, the computing device can comprise devices such as a local computer, a cellular phone, a portable media device, a personal digital assistant, or any device with the processing power and the ability to recognize a unique token. In one embodiment, a network enabled device comprises those devices not capable of recognizing a unique token.

Additionally, as used herein a tethered download is a file that contains a time-based DRM that expires after a certain amount of time. For example, if a user is part of a subscription service and has the rights to access a certain media file for a certain length of time, a tethered download of that media file is loaded onto the user's processor and the user will be able to play that file for a certain length of time (e.g., 30 days). At the end of the predetermined length of time, the file becomes unusable and can no longer be played by the user.

In addition, as used herein the terms content or media or media tiles are used broadly to encompass any type or category of experienceable, retrievable, filed and/or stored media, either singly or collectively, and individual items of media or content are generally referred to as entries, songs, tracks, items or files; however, the use of any one term is not to be considered limiting as the concepts, features and functions described herein are generally intended to apply to any storable and/or retrievable item that may be experienced by a user, whether audibly, visually or otherwise, in any manner now known or to become known. For example, audio, video, personal packaged audio and/or video content such as podcasting, music videos, RSS feeds, still images or photos, and/or variations and combinations thereof.

Figure 2:
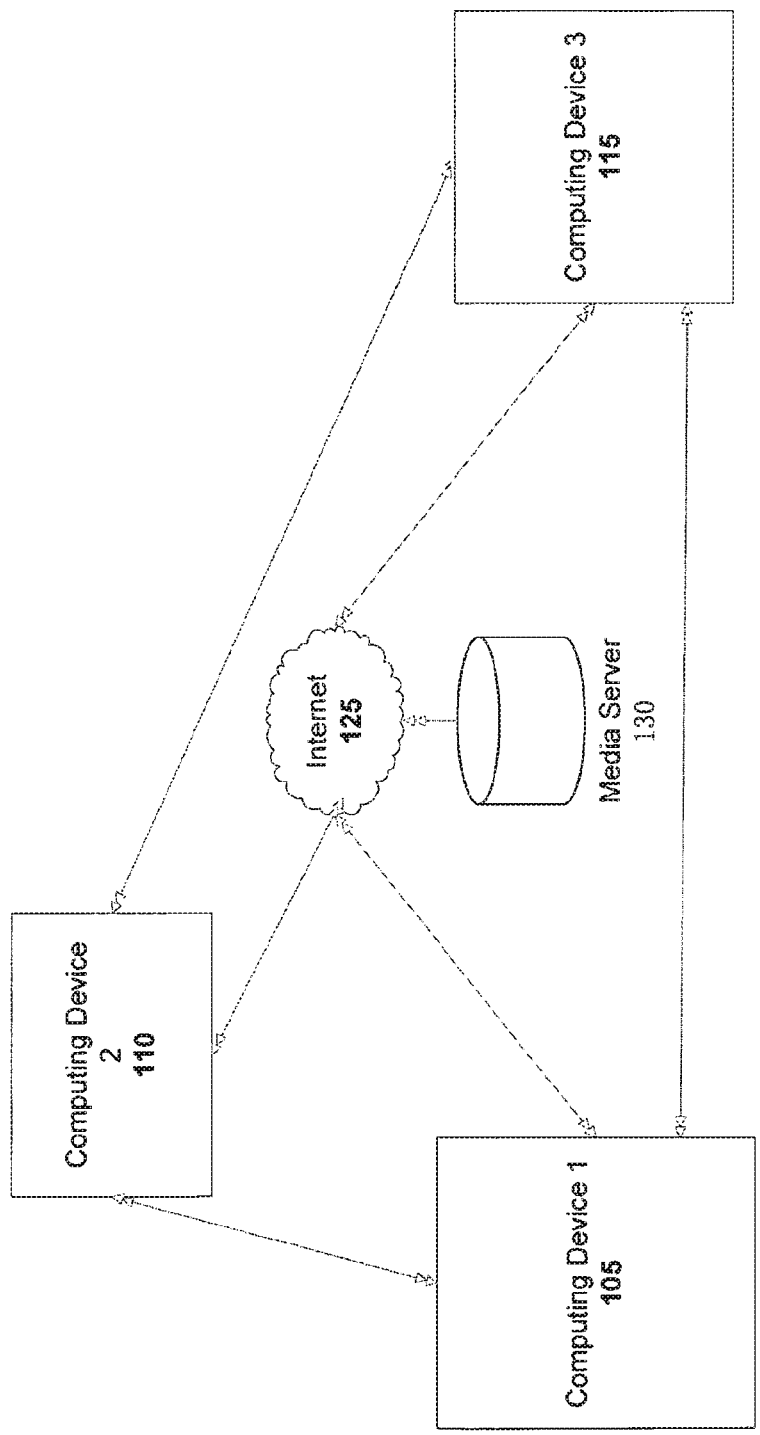
FIG. 2 is an exemplary system architecture of one embodiment.
Figure 3:
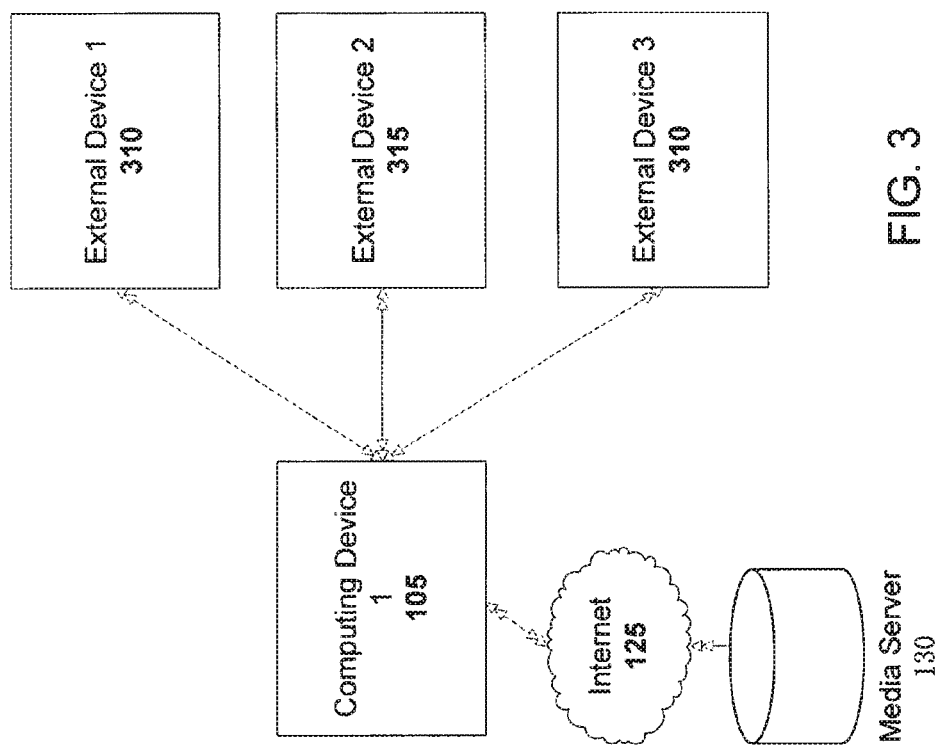
FIG. 3 is a schematic diagram illustrating an exemplary system architecture of one embodiment.

In one embodiment, the method and user interface for sharing a media collection among computing devices and/or network enabled devices in a network environment, allow each computing device and/or network enabled device to browse, access and/or playback any media file located with the network. Various combinations and variations of computing devices, network enabled devices, and the overall configurations of the network are contemplated. Some exemplary system architectures or configurations are depicted in FIGS. 1-3.

Figure 1:
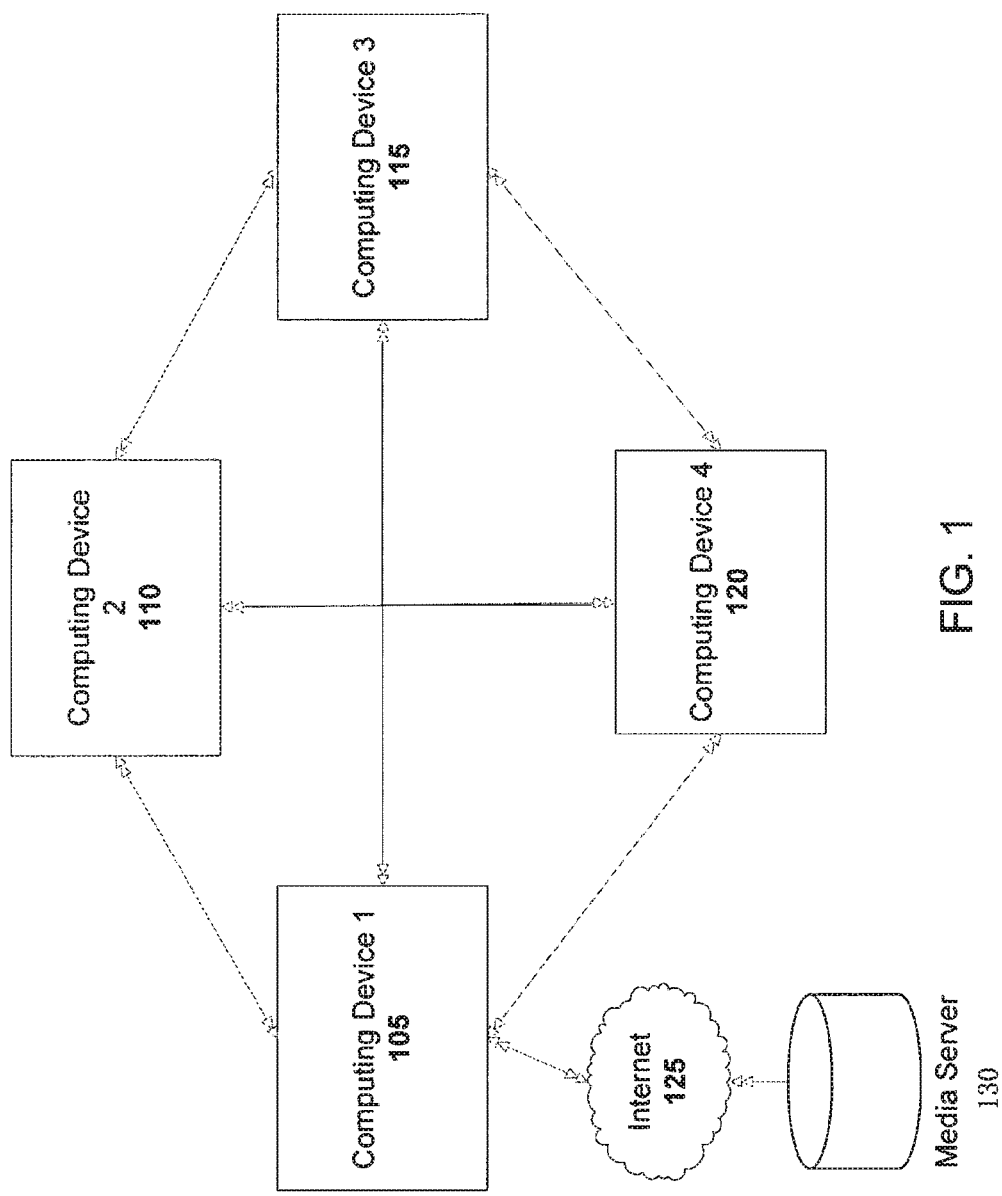
FIG. 1 is an exemplary system architecture of one embodiment.

In one embodiment, as depicted in FIG. 1, several computing devices 105, 110, 115, and 120 are a part of the network environment. Further, to create the network environment each computing device 105, 110, 115, and 120 is connected to each other. Thus, in one embodiment, as described in further detail herein, each computing device can access the media files associated with the any other computing device on the network. In one embodiment, some or all of the computing devices 105, 110, 115, and 120 may be connected to the internet 125. For example, in FIG. 1 only Computing Device 1 105 is directly connected to the Internet and the other computing devices 110, 115, and 120 are connected to Computing Device 1 105. Thus, each computing device can communicate with each other. In another example, as depicted in FIG. 2, each computing device 105, 110, and 115 has a direct connection to the internet 125. Further, as depicted in FIG. 3, Computing Device 1 105 may be connected to the internet 125 and in turn connected to several network enabled devices 310, 315, and 310. Of course, many combinations and variations of connections among the computing devices and/or network enabled devices and the internet are contemplated.

In a further embodiment, as depicted in FIG. 1, the internet connection allows a computing device, such as Computing Device 1 105, to communicate and access media files from an online media service, depicted as a media server 130, such as Yahoo! Media Engine and/or Musicmatch. In one embodiment, such an online media service allows a computing device to access thousands of media files available to the user via a subscription basis. Thus, in one embodiment, each computing device and/or network enabled device is capable of sharing, accessing, browsing, or playing the subscription based media files in a network environment.

Figure 4:
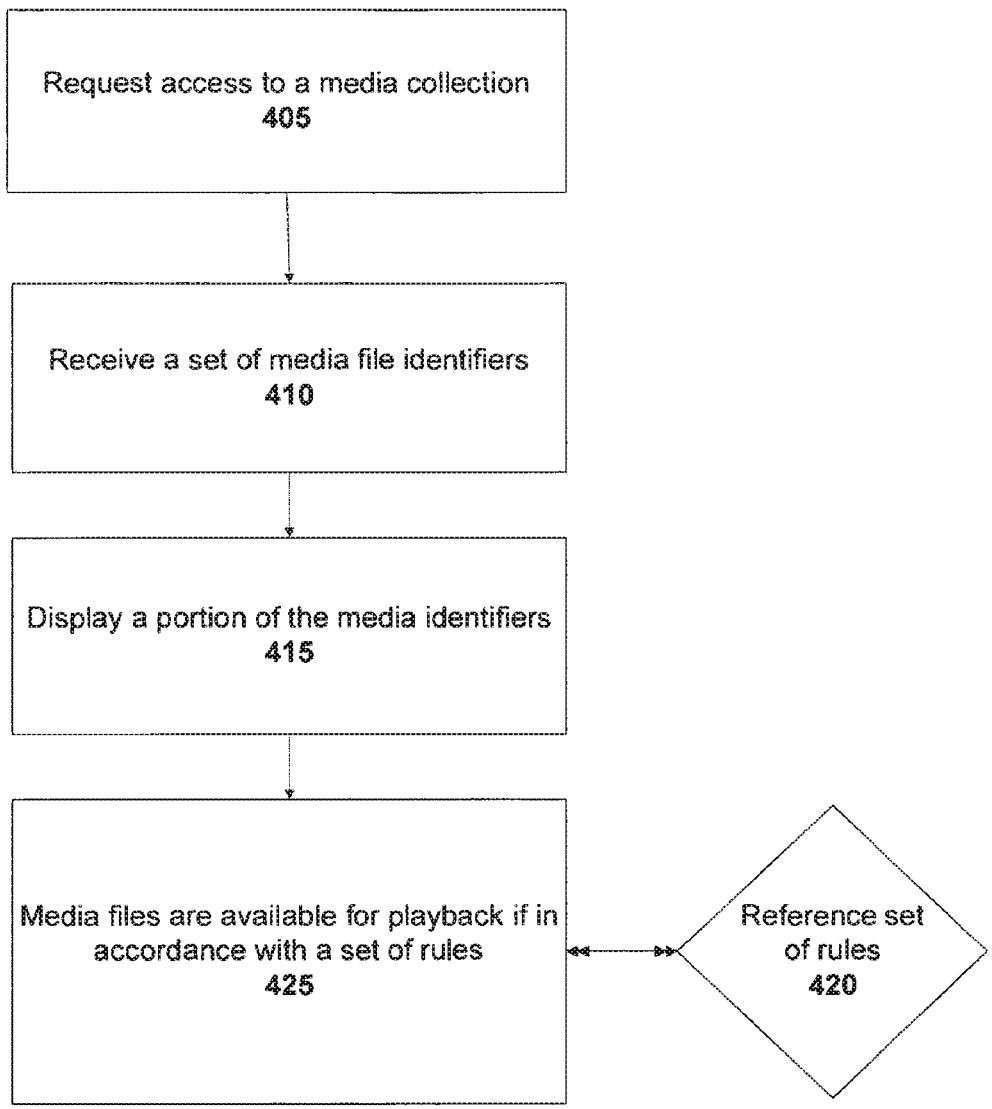
FIG. 4 is an exemplary flowchart according to one exemplary embodiment.

An exemplary method of sharing, accessing, browsing, and/or playing back a media file in a media file collection within a network environment is depicted in FIG. 4. As depicted in FIG. 4, first, one of the computing devices and/or network enabled devices on the network requests 405 access to a media collection on another computing devices and/or network enabled devices within the network.

In one embodiment, the request sequence 405 may comprise multiple steps. In one embodiment, the requesting device, the computing device requesting the media collection, first identifies itself to the network. It is contemplated that any computing device is capable of being characterized as the requesting device. Other interested devices will then in turn identify themselves with the requesting device. At this point, the requesting device submits its device identity to the particular device it wishes to share from. The sharing device, the computing device which is associated with the media collection being requested by the requesting device, then verifies the device credentials and depending on the verification, allows the requesting device to proceed.

As depicted in FIG. 4, the requesting device requests and receives 410 a set of media file identifiers from the computing devices and/or network enabled devices. In one embodiment, the media file identifiers comprise pointers, Uniform Resource Locators (URLs), and/or Uniform Resource Identifiers (URIs) associated with each media file in the requested media file collection and/or playlist. In another embodiment, the media file identifiers may also contain other information with respect to each media file such as whether the content is protected, the identity of the media file creator, the title, bit rate, duration, and/or size. In another embodiment, the requesting device can search for specific media that it is interested in. For example, it may request the first 5 tracks of unprotected audio belonging to the album Face in the Crowd, by artist Celeste. In another example, all audio files containing titles that start with the letter "A" belonging to the Genres Electronic and Dance. Then, based on the response some or the entire media file identifiers are displayed 415 at the requesting device. In a further embodiment, the requesting device receives any metadata associated with the request media file collection and/or playlist that is necessary to display the contents at the requesting device. For example, such metadata may comprise the media files' title, artist, bit rate, duration, file size, album, genre, creation date, protection flag, mimtetype etc. It should be appreciated that there may be an indeterminate amount of metadata associated with a media file. Further, a requesting device can specify explicitly the type of metadata it is interested in when making the request. In one embodiment, at this point, the requesting device is capable of displaying and browsing through the computing devices/network enabled device's media collection and/or playlists. However, in one embodiment, as depicted in FIG. 4, in order for the requesting device to playback those media files, a set of rules must first be referenced 420.

In one embodiment, the set of rules is referenced in order to provide or deny authorization to the media files. An exemplary set of rules depicted in FIG. 12 is described in further detail herein. In one embodiment, the media files are associated with an online media service. With reference to FIG. 4, after the set of rules have been referenced 420, and authorization is successful, the requesting device can playback 425 some or all of the media files. In one embodiment, the authorization to request, view and play content is entirely at the choosing of the sharing device. For example, it may limit a device to only request five files. In another embodiment, it may choose to authorize devices that are only connected to the local network. Further, even as the device is playing, it may choose to deauthorize and prevent the requesting device from performing further actions. In one embodiment, all of these functions are based on rules created apriori for that content, device, user, or all of the above.

In one such embodiment, the set of rules applies to media files available from an online media service based on a subscription to the media service. In one embodiment, each subscription is associated with allowing access to particular media file formats by assigning that subscriber a particular permission, subscription, or authorization level. For example, media files from online media services are typically available as a streamed media file, as a purchasable, permanent download, and/or as a tethered download. Accordingly, a subscription could be associated with a particular permission, subscription, or authorization level that allows that subscription to access all streaming media files and tethered downloads, but requires remittance in order to purchase a permanent download. In one embodiment, the level of access and the particular format of media files accessible may be dictated by price driven DRM fees and pre-determined licensed fees. However, in one embodiment, sharing media files (of all formats) from an online media service available based on a subscriber's associate authorization level in a network environment requires that each computing device and/or network enabled device adheres to a set of rules. In one embodiment, these rules are applied when a computing device and/or network enabled device attempt to access or browse a media file collection of another computing device and/or network enabled device on the network. In another embodiment, these rules are applied when a computing device and/or network enabled device attempts to playback any media file in the media file collections of another computing device and/or network enabled device on the network.

In one embodiment, it is contemplated that the network only comprises computing devices. In another embodiment, the network may comprise a combination of computing device(s) and network enabled device(s). Further, each computing device has a particular subscription to an online media service and thus authorization level associated with it. Thus, in one embodiment, the level of access between these computing devices depends on their associated subscription level and the type of media files being accessed. FIG. 12 depicts an exemplary chart illustrating a set of rules. As can be seen in FIG. 12, the set of rules is based on an online media service subscription level associated with the requesting computing device and the sharing device and the media file format. Referring to FIG. 12, the requesting computing device comprises the computing device requesting access and/or playback of a media file from another computing device on the network. Further, the sharing computing device comprises the computing device from which the media file collection and/or playlist is being requested from.

As depicted in FIG. 12, in one embodiment, if the requesting computing device does not have any subscription to the online media service 1205, but the sharing computing device has a subscription 1210, then for the streaming media files associated with the sharing computing device's media collection, the requesting device can only play a portion of the media file 1215. For example, the requesting device could only play a 30 second clip of the media file. In another embodiment, the requesting device could be denied all access to the media file.

In another embodiment, if the requesting computing device does not have any subscription to the online media service 1205, but the sharing computing device has a subscription 1210, then for the tethered downloaded media files associated with the sharing computing device's media collection, the requesting device has full access provided that the sharing device has proper access 1220. However, in another embodiment, the requesting device must sign into the online media service under the sharing device's subscription id 1220. Then, the sharing device has full access to the tethered downloads.

In another embodiment, if the requesting computing device does not have any subscription to the online media service 1205, but the sharing computing device has a subscription 1210, then for the purchased downloaded media files associated with the sharing computing device's media collection, the requesting device has full access provided that the sharing device has proper access 1225. However, in another embodiment, the requesting device must sign into the online media service under the sharing device's subscription id 1225. Then, the sharing device has full access to the purchased downloads.

In yet another embodiment, if the requesting computing device does not have any subscription to the online media service 1205, but the sharing computing device has a subscription 1210, then for the non-DRM media files, media files with no associated licensing and purchasing rights, associated with the sharing computing device's media collection, the requesting device has full access to the non-DRM media files 1230.

In another embodiment, if both the requesting computing device and the sharing computing device are both associated with subscriptions 1235, 1240, then the requesting computing device may have full access 1245-1260 to every media file regardless of whether the file is a streamed file, a tethered download, a purchased download, and/or non-DRM.

In a further embodiment, the computing devices and/or network enabled devices within the network may be restricted to a set of rules not associated with a subscription to an online media service. For example, a set of rules may limit the number of devices that can share media files among each other. In another embodiment, this number may be based on the number of computing devices and does not account for network enabled devices. In another embodiment, a set of rules may only allow a computing device to stream media files to a certain number of network enabled devices. In another embodiment, a set of rules may require that all the computing devices and/or network enabled devices be located on the same subnet. Of course, many variations of rules, whether subscription based or not, known to those skilled in the art are contemplated.

In one embodiment, with reference to FIG. 1, in one example, the requesting device is Computing Device 1 105 and the sharing device is Computing Device 2 110. Of course, the requesting and sharing computing device may be any computing device within the network. Referring to FIG. 1, if the requesting device 105 is granted access to the media files associated with the sharing computing device's 110 media collection, the requesting computing device 105 can stream the media file directly from the sharing computing device 110. In another embodiment, the requesting device 105 can stream the media file directly from the media server 130. For example, the requesting media device can obtain an identifier, pointer, URL, URI, or bookmark associated with the media file and use it to request the associated media file directly from the server.

In one embodiment, in which a network comprises a network enabled device, each network enabled device streams the media files, regardless of format or subscription, from the sharing media device. In another embodiment, if necessary, the computing device will request the media file from a media server and then stream it back to the requesting network enabled device.

Of course, these embodiments are not limited to streaming, tethered downloads, and/or purchased downloads, but can apply to any media files which require a specified level of sharing, viewing, and/or playing access. For example, it could be negotiated that certain media files generally not available for full-length sharing could be shared and played between any computing device and/or network enabled device of any status (subscribing or non-subscribing) for a pre-determined number of times.

In one embodiment, a user interface assists in the accessing, sharing, searching, and/or playback of a media collection in a network environment. In one embodiment, the user interface may be a part of a media management program, for example Yahoo! Music Engine or Musicmatch Jukebox. Accordingly, in one embodiment, the ability to share, search, and/or playback a media collection in a network environment is incorporated as a network application. In one embodiment, the network application may be a characterized network feature or component of a media management program. An exemplary embodiment of user interfaces for sharing a media collection in a network environment is depicted in FIGS. 5-11.

Figure 5:
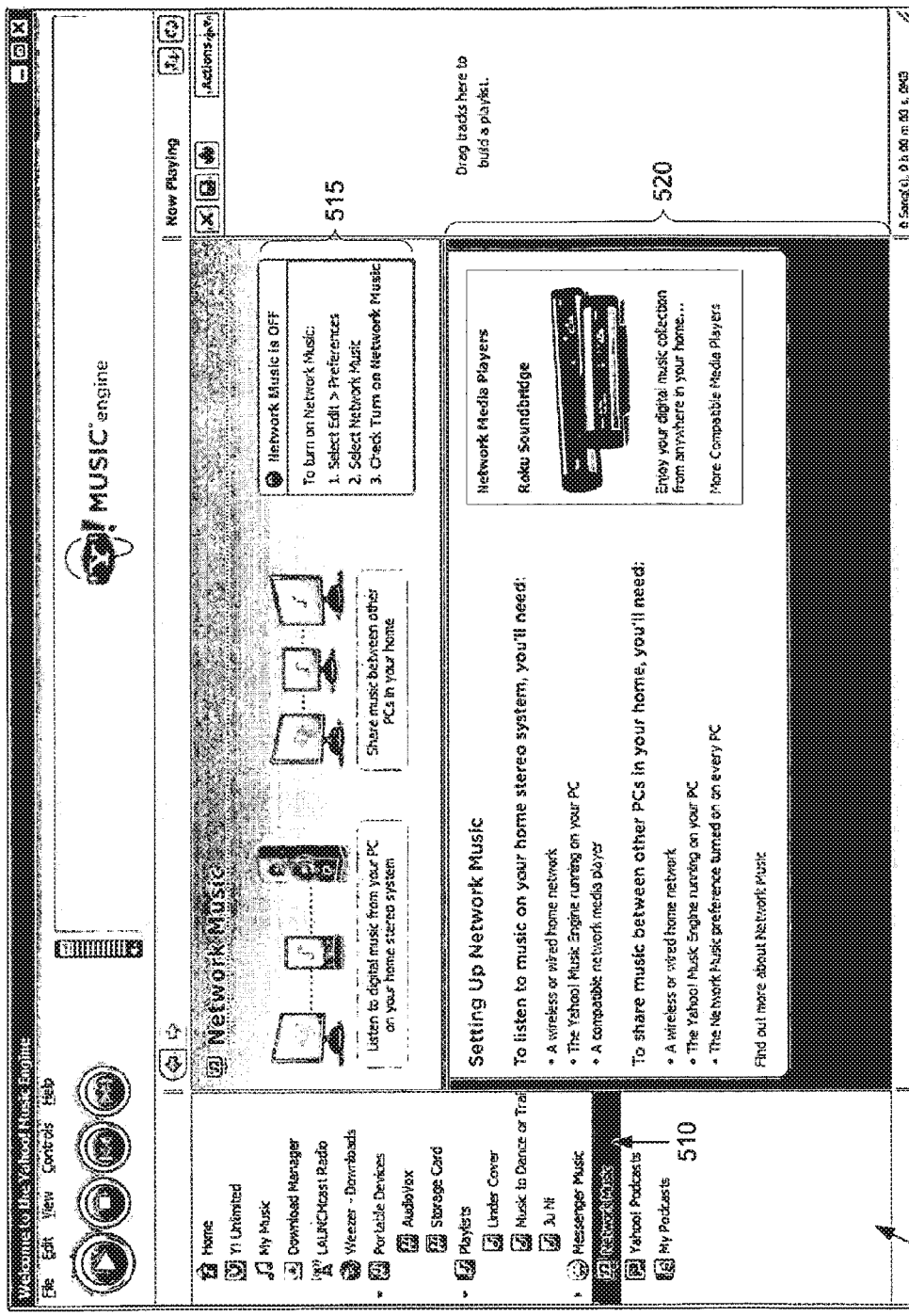
FIG. 5 is an exemplary user interface according to one exemplary embodiment.

FIG. 5 depicts an exemplary user interface of when the network is offline. As can be seen in FIG. 5, the user interface comprises a menu area 505 for browsing the features of a media management program including indicia 510 for selecting a network application for sharing, searching, and/or playback of a media collection in a network environment. Further, as can be seen in FIG. 5, the user interface comprises an area 515 for enabling the network application and selecting preferences and an area 520 comprising instructions associated with configuring and managing the network feature.

Figure 11:
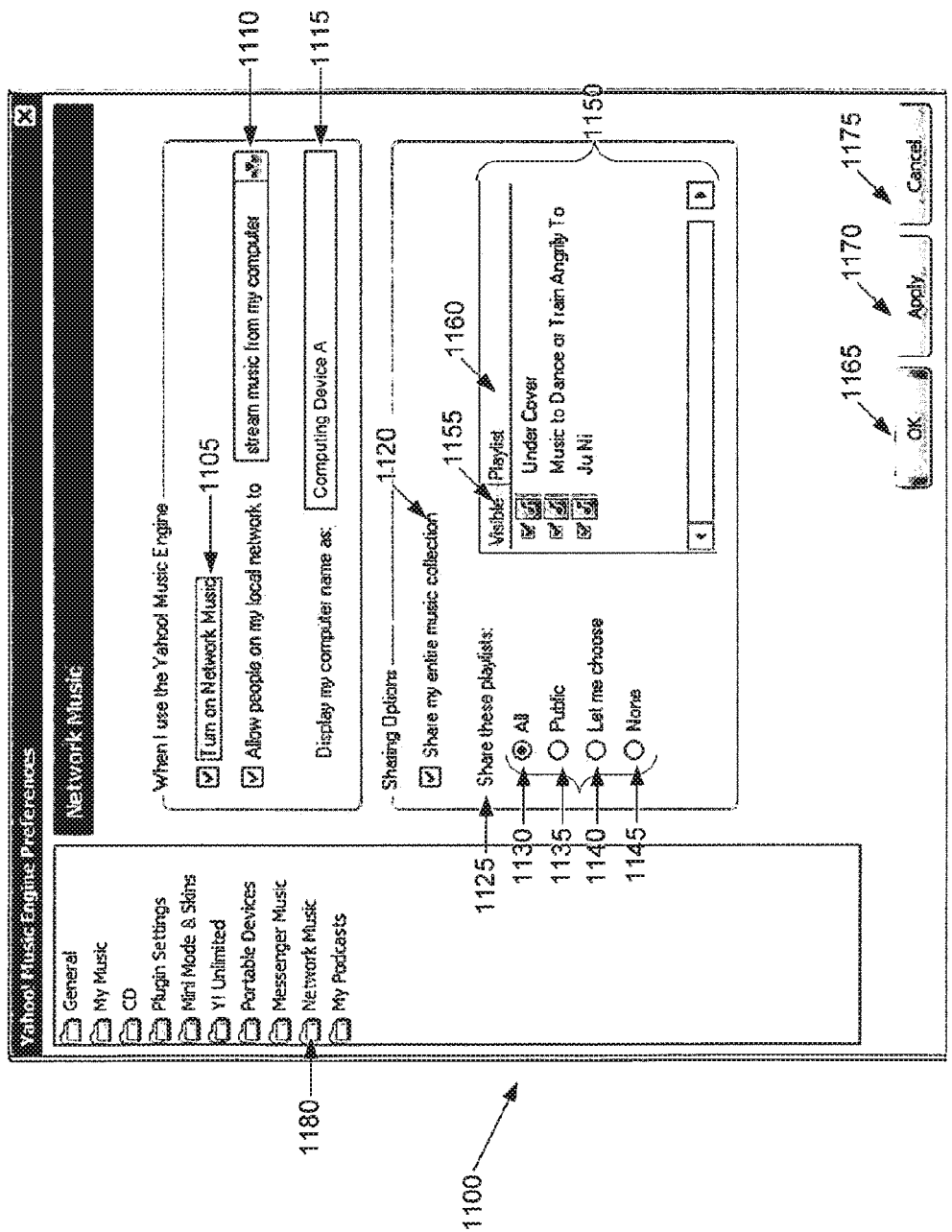
FIG. 11 is an exemplary user interface according to one exemplary embodiment.

In one embodiment, the network preferences enable a user to edit and configure features and settings associated with the network application. An exemplary user interface 1100 for setting the network application preferences is depicted in FIG. 11. As can be seen in FIG. 11, a list of file folders 1180 is presented, with network music being selected (as shown at the top of the user interface 1100). The preferences comprise settings that are associated when a user turned on the media management application and settings associated with sharing options between computing devices and/or network enabled devices in network environment. For example, the settings comprise a field box 1105 for turning the network music on and off, a field box and a drop down menu 1110 for allowing a selection as to whether to allow other users to stream media files from a user's local computing device or to only allow others to view media from a user's local computing device (not depicted), and a field box 1115 for entering the name of a local user's computing device. In a further embodiment, the network application sharing options comprise a field box 1120 first for enabling a user's entire media collection to be shared, an option 1125 of selecting a particular playlist to be shared within the network environment such as sharing all playlists 1130, only those playlists designated as publicly available 1135, those playlists specifically chosen by a user 1140, and sharing no playlists 1145. Accordingly, area 1150 displays the playlist selected to view the option 1125 of selecting a particular playlist to be shared in the network environment. For example, selecting the sharing all option 1130 causes area 1150 to display all of a user's playlists that are available for sharing across the network environment. Further in one embodiment, area 1150 comprises a column 1160 for listing the playlist title and a column 1155 comprising the field box were a user can manually select or deselect a playlist to be shared on the network. Further the user interface depicted in FIG. 11 comprises user input indicia such as buttons for enabling 1165 the selected preferences, applying 1170 the selected preferences, and canceling 1175 the selected preferences. Of course, it is contemplated that a user can select and/or edit the network application preferences at any time.

Figure 6:
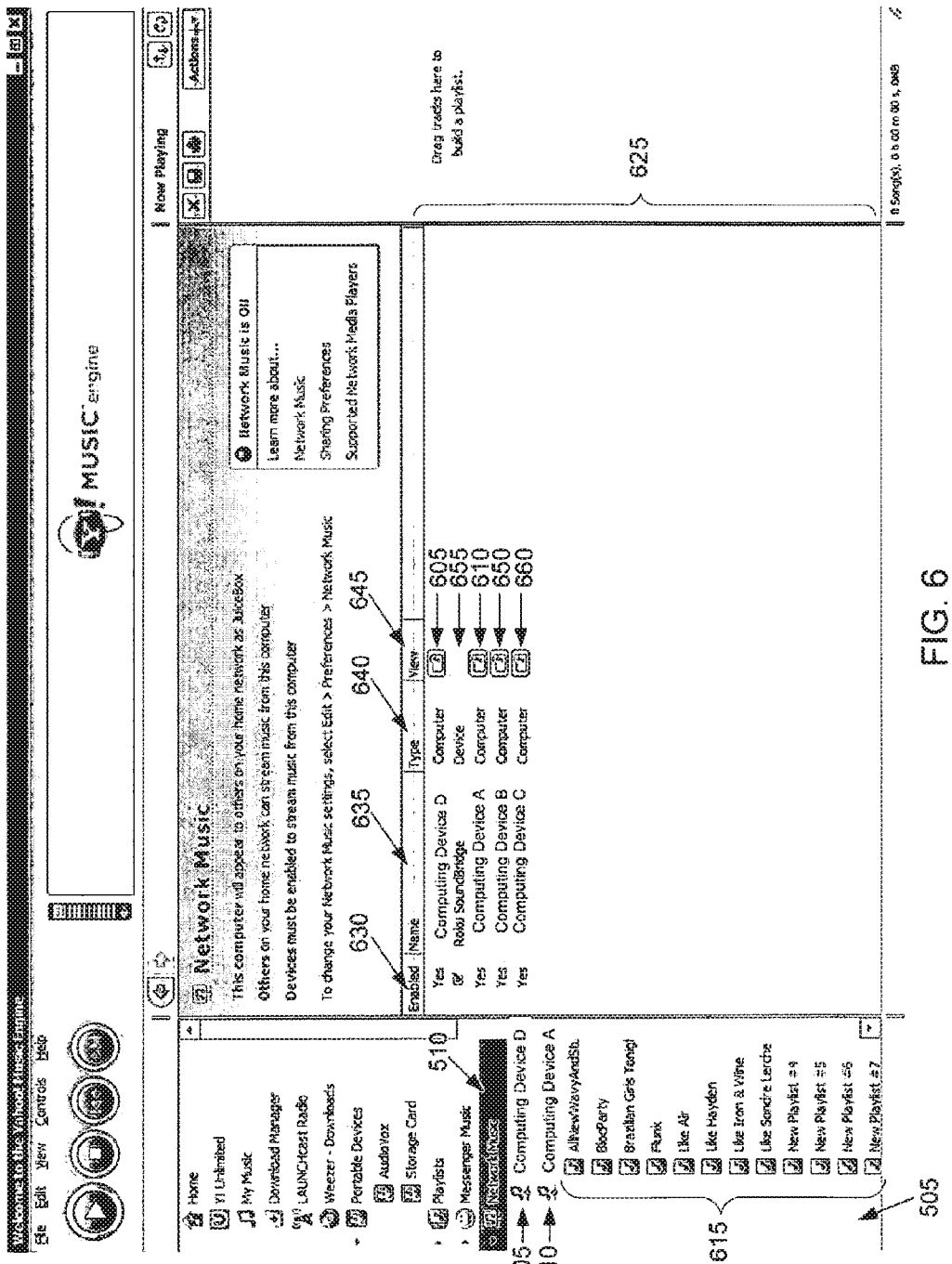
FIG. 6 is an exemplary user interface according to one exemplary embodiment.

In one embodiment, once the network application is enabled, the user interface displays all but computing devices and/or network at a network enabled devices available in the network environment. FIG. 6 depicts an exemplary user interface of when the network is enabled or online. The user interface of FIG. 6 comprises the menu area 505 for browsing the features of a media management program. As can be seen in FIG. 6, the indicia 510 for selecting a network application for sharing, searching, and/or playback of a media collection in a network environment have been selected. Further, in one embodiment, upon selecting the network indicia 510, a menu listing each computing device 605, 610 and/or network enabled device available on the network appears. In one embodiment, as depicted in FIG. 6, upon highlighting or otherwise selecting a listed computing device 610, a list 615 of the playlists and/or a media collection associated with the listed computing device 610 appears. In other embodiments, the available artists, albums, media files, songs, or other associated media file category associated with the listed computing device may appear upon selecting a listed computing device and/or network enabled device. As depicted in FIG. 6, the user interface further comprises an area 625 listing identifiers associated with each of the computing devices and/or network enabled devices available on the network. As can be seen in FIG. 6, the network comprises four computing devices 605, 610, 650, 660 and a network enabled device 655. The computing device and/or network enabled device the user is currently located at may or may not be listed among the available devices, however viewable from the user interfaces of the other devices. In a further embodiment, the area 625 is organized in columnar format such as a column 630 indicating whether the computing device or network enabled device is enabled, a column 635 listing the name associated with the computing device, network enabled, device and/or subscriber id, a column 640 indicating the type of device, a column 645 comprising a link for viewing the media collection associated with the computing device and/or network enabled device. For example, an enabled computing device 610 available in the network environment is associated with the name "Computing Device A." Further, a user can browse the media collection associated with "Computing Device A" 610. In one embodiment, the user can browse, playback, or otherwise access the media collection associated with "Computing Device A" by selecting the link 645. In another embodiment, the user can browse, playback, or otherwise access the media collection associated with "Computing Device A" by selecting the link 610 listed in the menu 505. In one embodiment, as described in further detail herein, the ability to playback a media file is determined according to a set of rules.

Figure 7:
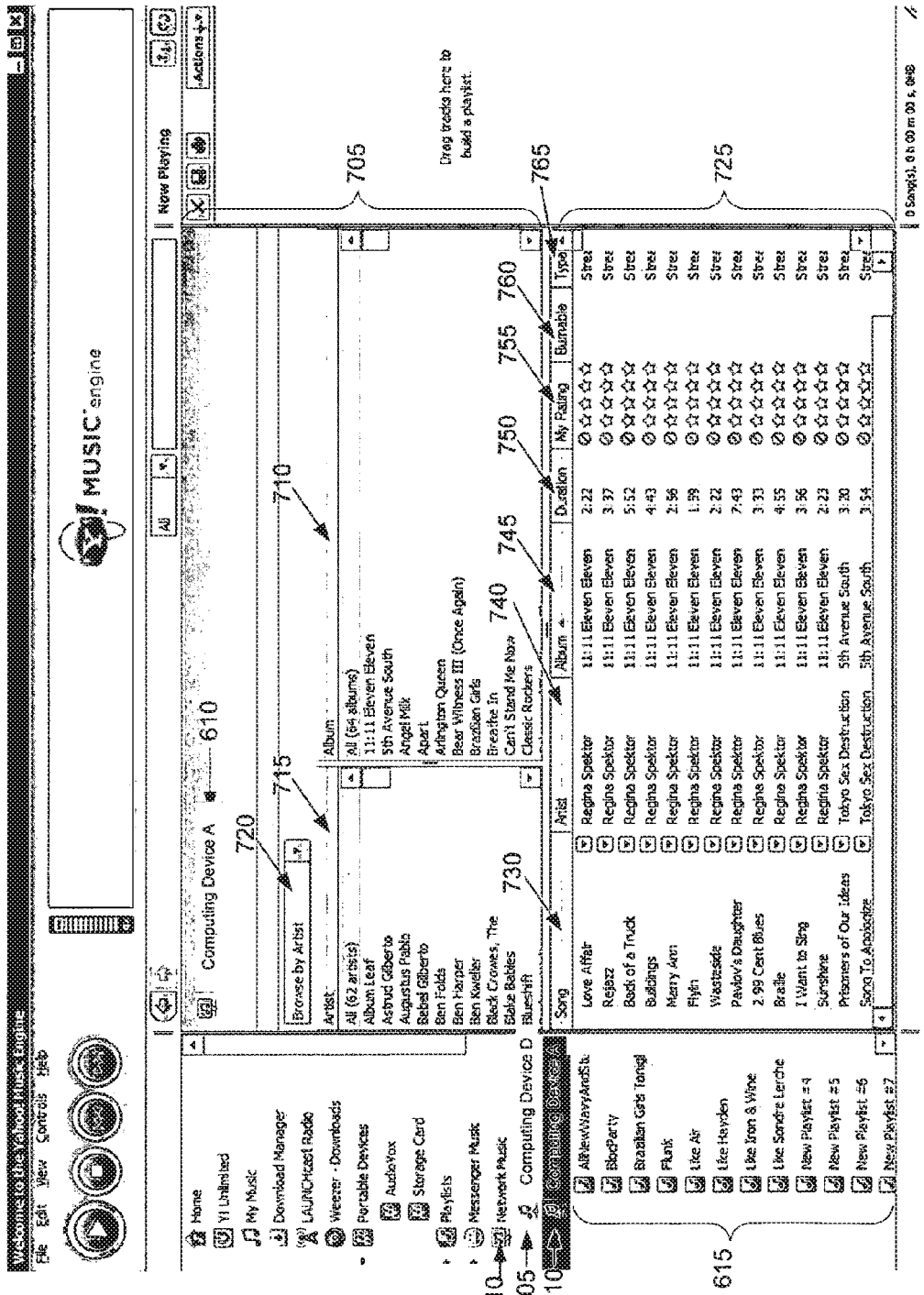
FIG. 7 is an exemplary user interface according to one exemplary embodiment.

In any event, in one embodiment, once a user selects a computing device and/or network enabled device in area 705 to view and/or access the media collection, the user is able to browse the media collection by artist, genre, song/media file, album, and/or any other identifiable media file category. Thus, this allows for easy organization and access of a remote media collection. In one embodiment the user interface comprises the drop-down menu for selecting the category for browsing a media collection. FIG. 7 depicts an exemplary user interface of browsing Computing Device A's 610 media collection by artist. As can be seen in FIG. 7, "artist" has been selected from the drop-down menu 720. In one embodiment, area 715 displays all of the artist of Computing Device A's media collection. In one embodiment as depicted in FIG. 7, area 715 is a scrollable area listing each artist alphabetically allowing a user to search by artist name. In one embodiment, selecting an artist from area 715 causes all the media files from this issue with that artist located in Computing Device A's media collection to be displayed in columnar format. For example and as depicted in FIG. 7, all artists have been selected from areas 715. Accordingly, area 725 displays all the artists located in computing devices media collection. Further, area 725 comprises several columns such as a column 730 listing the media file title, a column 740 listing the artist associated with the media file, a column 745 listing all of the names associated with the media file, column 750 listing the duration or length of the media file, column 755 listing a user or community applied rating associated with the media file, column 760 for displaying an icon indicating whether the media file is transferable to a portable device or medium, and/or column 765 for listing the type of media file and/or how the media file may be acquired from a computing device. Further in one embodiment depicted in FIG. 7, the user interface comprises a scrollable area 710 listing all of computing devices media collection organized by album name. Thus although the drop-down menu 720 allows the user to browse by artist, in one embodiment the user interface also allows the user to browse by album 710. Further, from this user interface, according to a set of rules as described in further detail here, each media file listed may be played by the user.

Figure 8:
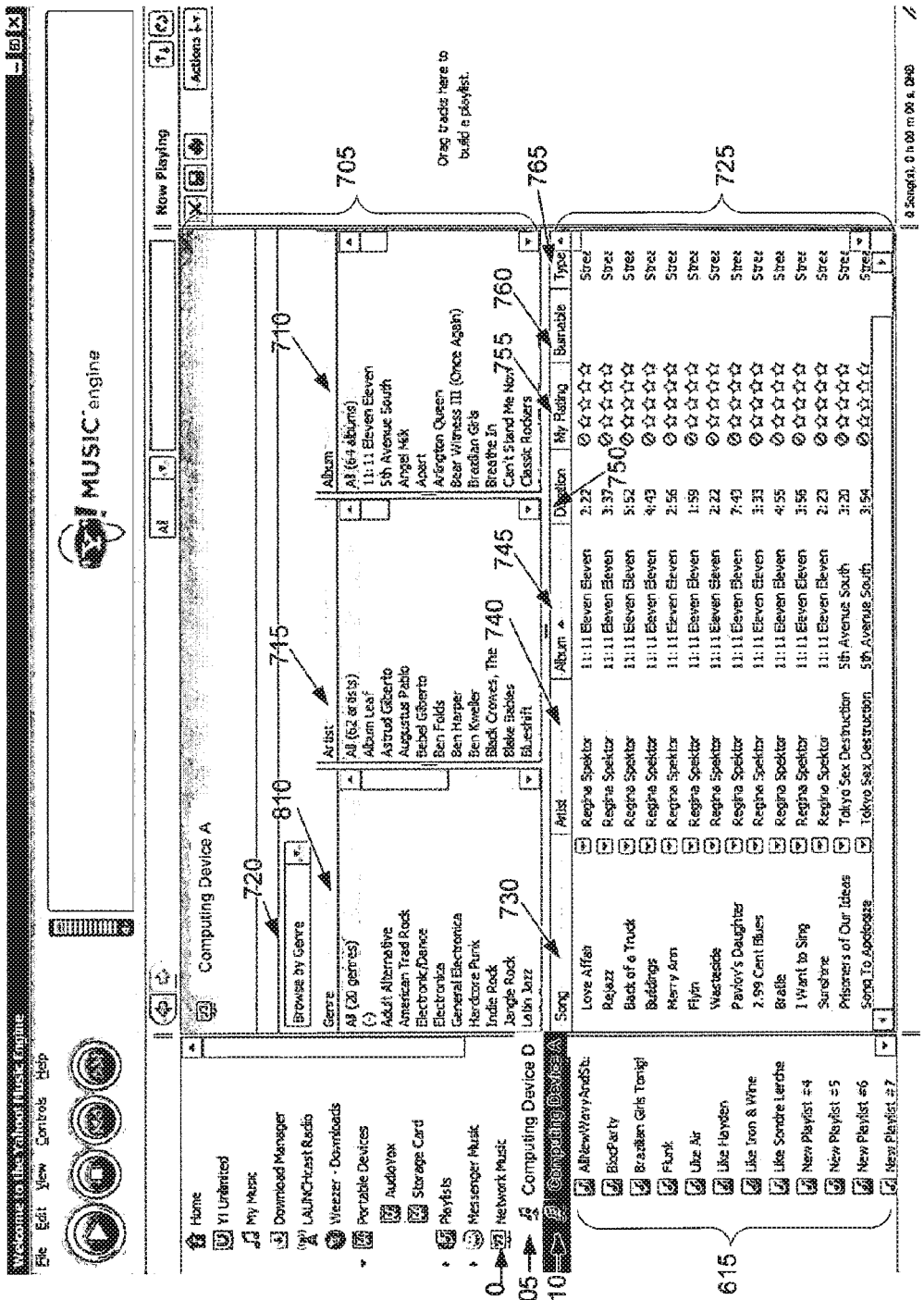
FIG. 8 is an exemplary user interface according to one exemplary embodiment.

FIG. 8 depicts an exemplary user interface of browsing a media collection in a network by genre. As can be seen in FIG. 8, "genre" has been selected from the drop-down menu 720 in area 705. In one embodiment, area 810 displays Computing Device A's media collection organized alphabetically by artist thus allowing a user to search by genre. In one embodiment, selecting a genre from area 810 causes all the media files in Computing Device A's media collection to be displayed in columnar format. For example and as depicted in FIG. 8, all genres have been selected from areas 810. Accordingly, area 725 displays all the genres associated with Computing Device A's media collection. Further area 725 comprises several columns such as a column 730 listing the media file's associated title, a column 740 listing the artist associated with the media file, a column 745 listing the album associated with the media file, column 750 listing the duration or length of the media file, column 755 listing a user or community applied rating associated with the media file, column 760 for displaying an icon indicating whether the media file is transferable to a portable device or medium, and/or column 765 for listing the type of media file and/or how the media file may be acquired from Computing Device A. Further in one embodiment as depicted in FIG. 7, the user interface comprises a scrollable area 710 listing all of the computing devices media collection organized by album name. Thus although the drop-down menu 720 allows the user to browse by genre, in one embodiment, the user interface also allows the user to browse by album 710 and artist 715. Similarly, from this user interface, according to a set of rules as described in further detail here, each media file listed may be played by the user.

Figure 10:
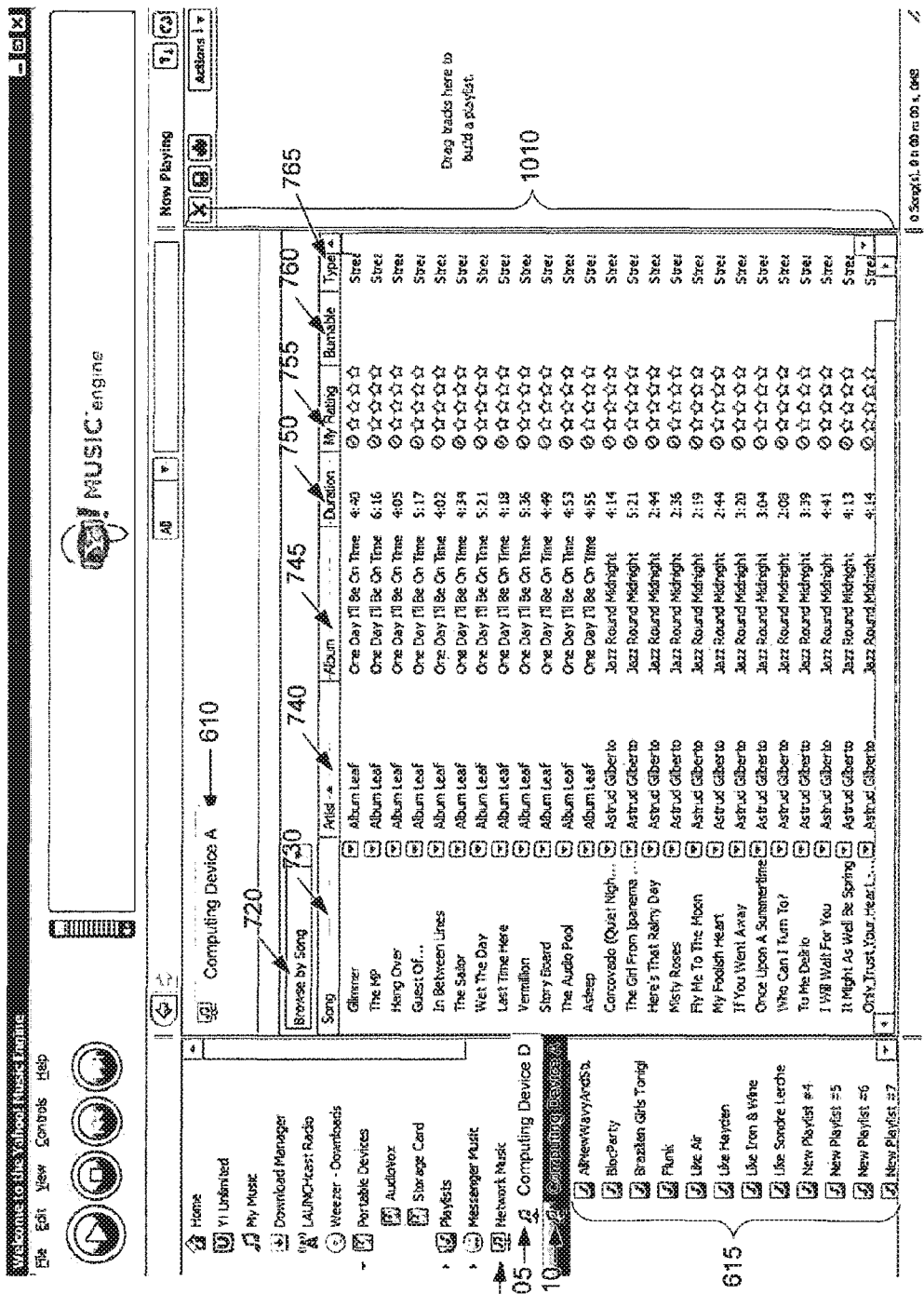
FIG. 10 is an exemplary user interface according to one exemplary embodiment.

FIG. 10 depicts an exemplary user interface of browsing a media collection in a network by song or media file title. As can be seen in FIG. 8, "song" has been selected from the drop-down menu 720. In one embodiment, selecting song or media file title from the drop down menu 720 causes all the media files in Computing Device A's media collection to be displayed via media file title in columnar format in an area 1010. For example and as depicted in FIG. 10, area 1010 displays all the media file titles associated with Computing Device A's media collection. Further, area 1010 comprises several columns such as a columns 730 listing the media file's associated title, a column 740 listing the artist associated with the media file, a column 745 listing the album associated with the media file, column 750 listing the duration or length of the media file, column 755 listing a user or community applied rating associated with the media file, column 760 for displaying an icon indicating whether the media file is transferable to a portable device or medium, and/or column 765 for listing the type of media file and/or how the media file may be acquired from Computing Device A. Again, from this user interface, according to a set of rules as described in further detail here, each media file listed may be played by the user.

In another embodiment, a user can browse the playlists associated with a media collection available on the network. For example, as depicted in FIGS. 6-10, a menu lists the network application 510 choice which expands to list some or all of the computing devices and/or network enabled device available in the network environment. For example, as depicted in FIG. 6, menu lists Computing Device D 605 and Computing Device A 610 under the network application choice 510. Further, in one embodiment as depicted in FIG. 6, each computing device and/or network enabled device choice 605, 610 can be expanded to list all the playlists available on that particular computing device and/or network enabled device. For example, in FIG. 9, Computing Device A 610 has been expanded to show all of its available playlists 615. As discussed herein, through a preferences user interface, a user is able to configure which playlists are available to the other computing devices and/or network enabled devices on the network.

In another embodiment as illustrated in FIG. 6, the sharing device may choose to discover and display all other devices on its network or some subset of them based on some preference criteria. For example, the sharing device may choose to only display to other devices that can play DRM protected Windows Media content. In one embodiment, it is not necessary for a device to make a request to be visible to the sharing device. In another embodiment, the sharing device may choose to automatically have any device that it can discover to perform some specific action, if the target devices allow this. For example, with reference to FIG. 6, the sharing device may choose to have Device A 610 play an audio track while Device B 650 is playing a slideshow. Or alternately, the sharing device may choose to pause Device A 610 while it is performing some action like play.

Figure 9:
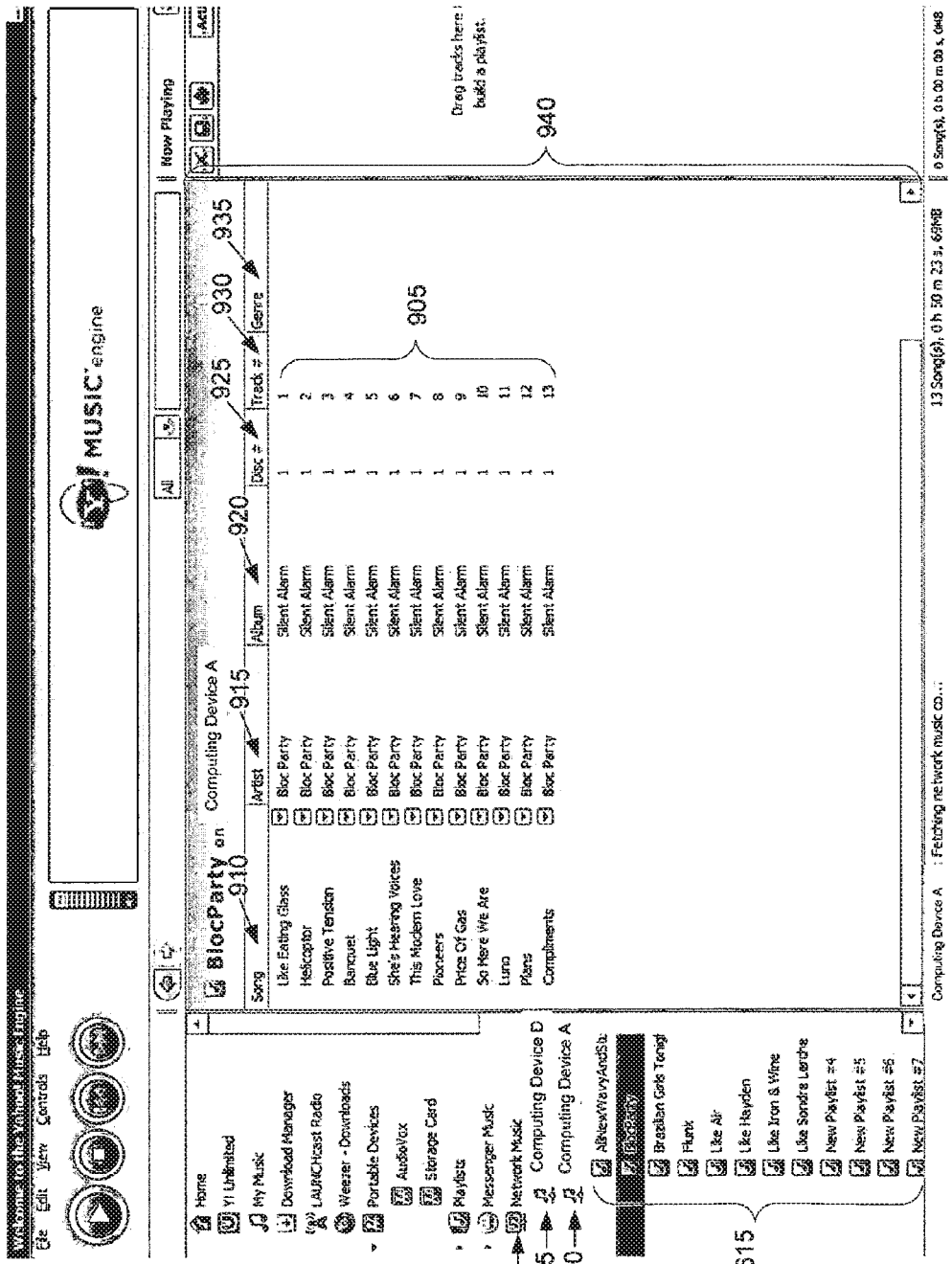
FIG. 9 is an exemplary user interface according to one exemplary embodiment.

In one embodiment, as depicted in FIG. 9, a user can access and/or play any playlist listed in the menu 615 by selecting and/or highlighting the playlist choice 905. As depicted in FIG. 9, selecting the "Bloc Party" playlist 905 from the menu 615 causes the media files in the playlist 905 to be displayed in an area 940. In one embodiment, the media files in the playlist are displayed in columnar format comprising columns listing information associated with each media file. For example, column 910 lists the media file title, column 915 lists the artist associated with the media file, column 920 lists the album name associated with the media, column 925 lists the disc number associated with the media file, column 930 lists the track number associated with the media file, and column 935 lists the genre associated with the media file. Of course from this user interface, according to a set of rules as described in further detail here, each media file listed may be played by the user by selecting or highlighting the desired media file.

Those skilled in the art will recognize that the method and system of the present disclosure within the application may be implemented in many manners and as such is not to be limited by the foregoing exemplary embodiments and examples. In other words, functional elements being performed by a single or multiple components, in various combinations of hardware and software, and individual functions can be distributed among software applications at either the client or server level. In this regard, any number of the features of the different embodiments described herein may be combined into one single embodiment and alternate embodiments having fewer than or more than all of the features herein described are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known features of those variations and modifications through the system component described herein as would be understood by those skilled in the art.

What is claimed is:

1. A system, comprising:
a first computing device comprising a first media management program and a first media collection, wherein the first media management program comprises a first network music function and a first user interface, wherein the first network music function facilitates sharing the first media collection with one or more other computing devices, wherein the first media collection comprises a plurality of media files, and wherein the first computing device is configured to:
receive a first input;
turn on the first network music function responsive to the first input;
receive a second input;
set a first name associated with the first media collection responsive to the second input;
receive a third input; and
allow the first computing device to share the first media collection with the second computing device responsive to the third input; and
a second computing device comprising a second media management program and a second media collection, wherein the second media management program comprises a second network music function and a second user interface, and wherein the second computing device is configured to:
receive a fourth input;
turn on the second network music function responsive to the fourth input;
display the second user interface, wherein the second user interface comprises a first area, a second area, and a third area, wherein the first area comprises a first menu listing the first name, wherein the second area is configured to allow a user to browse the first media collection, and wherein the third area is configured to prompt a user to drag tracks from the first media collection to the third area to build a playlist;
receive a fifth input requesting that a selected media file from the plurality of media files be played; and
stream the selected media file directly from the first computing device in response to the fifth input.

2. The system of claim 1, wherein the second input and the third input are received on a third user interface.

3. The system of claim 2, wherein the third user interface is accessed from the first media management program.

4. The system of claim 2, wherein the first input is received on the third user interface.

5. The system of claim 1, wherein the first computing device is further configured receive a fifth sixth input for selecting a subset of the plurality of media files to be shared with the second computing device.

6. The system of claim 1, wherein the first user interface comprises a third area and a fourth area, wherein the third area comprises a second menu listing a second name, wherein the second name is associated with the second media collection, and wherein the fourth area is configured to allow the user to browse the second media collection.

7. The system of claim 1, wherein the first computing device and the second computing device are located in a same local area network.

8. The system of claim 1, wherein the first menu further comprises a third name, and wherein the third name is associated with a third media collection of a third computing device.

9. A first computing device, comprising:
at least one processor; and
a memory coupled to the at least one processor and configured to store a first media collection and programming instructions, wherein the first media collection comprises a first plurality of media files, and wherein the programming instructions, when executed by the at least one processor, cause the first computing device to:
receive a first input;
turn on a first network music function of a first media management program responsive to the first input, wherein the first media management program is executed by the first computing device;
receive a second input;
set a first name associated with the first media collection responsive to the second input;
receive a third input;
allow the first computing device to share the first media collection with a second computing device responsive to the third input;
display a first user interface of the first media management program, wherein the first user interface comprises a first area, a second area, and a third area, wherein the first area comprises a menu listing a second name associated with a second media collection of the second computing device, wherein the second media collection comprises a second plurality of media files, wherein the second area is configured to allow a user to browse the second media collection, and wherein the third area is configured to prompt a user to drag tracks from the second media collection to the third area to build a playlist;
receive a fourth input requesting that a selected media file from the second plurality of media files be played; and
stream the selected media file directly from the second computing device in response to the fourth input.

10. The first computing device of claim 9, wherein the second input and the third input are received on a second user interface, and wherein the second user interface is accessed from the first media management program.

11. The first computing device of claim 10, wherein the first input is received on the second user interface.

12. The first computing device of claim 9, wherein the programming instructions, when executed by the at least one processor, further cause the first computing device to receive a fifth input for selecting a subset of the first plurality of media files to be shared with the second computing device.

13. The first computing device of claim 9, wherein the first computing device and the second computing device are located in a same local area network.

14. The first computing device of claim 9, wherein the menu further comprises a third name associated with a third media collection of a third computing device.

15. The first computing device of claim 9, wherein the programming instructions, when executed by the at least one processor, further cause the first computing device to build a first playlist comprising a first media file identifier after the first media file identifier is dragged to the third area, and wherein each media file identifier is associated with one of the second plurality of media files.

16. The first computing device of claim 9, wherein the second media collection is shared by a second network music function of a second media management program, and wherein the second media management program is executed by the second computing device.

17. A computer program product comprising computer-executable instructions that are stored on a non-transitory computer-readable medium and that, when executed by a processor, are configured to cause a first computing device to:
receive a first input;
turn on a first network music function of a first media management program responsive to the first input, wherein the first media management program is executed by the first computing device;
receive a second input;
set a first name associated with a first media collection of the first computing device responsive to the second input, wherein the first media collection comprises a first plurality of media files;
receive a third input;
allow the first computing device to share the first media collection with a second computing device responsive to the third input;
display a first user interface of the first media management program, wherein the first user interface comprises a first area, a second area, and a third area, wherein the first area comprises a menu listing a second name associated with a second media collection of the second computing device, wherein the second media collection comprises a second plurality of media files, wherein the second area is configured to allow a user to browse the second media collection, and wherein the third area is configured to prompt a user to drag tracks from the second media collection to the third area to build a playlist;
receive a fourth input requesting that a selected media file from the plurality of media files be played; and
stream the selected media file directly from the first computing device in response to the fourth input.

18. The computer program product of claim 17, wherein the second input and the third input are received on a second user interface, and wherein the second user interface is accessed from the first media management program.

19. The computer program product of claim 18, wherein the first input is received on the second user interface.

20. The computer program product of claim 17, wherein the computer-executable instructions are further configured to cause the first computing device to receive a fifth input for selecting a subset of the first plurality of media files to be shared with the second computing device.

21. The computer program product of claim 17, wherein the first computing device and the second computing device are located in a same local area network.

22. The computer program product of claim 17, wherein the menu further comprises a third name associated with a third media collection of a third computing device.

23. The computer program product of claim 17, wherein programming instructions, when executed by the at least one processor, further cause the first computing device to build a first playlist comprising a first media file identifier after the first media file identifier is dragged to the third area, and wherein each media file identifier is associated with one of the second plurality of media files.

24. The computer program product of claim 17, wherein the second media collection is shared by a second network music function of a second media management program, and wherein the second media management program is executed by the second computing device.

25. The system of claim 1, wherein the first computing device is further configured to receive a first selection of particular media files to be shared with the second computing device.

26. The system of claim 1, wherein the first computing device is further configured to receive a second selection permitting all of the first media collection of the first computing device to be shared with the second computing device.

27. The system of claim 1, wherein the first media collection comprises a first plurality of identifiers that each identifies a respective media file.

* * * * *

UNITED STATES PATENT AND TRADEMARK OFFICE
CERTIFICATE OF CORRECTION

| | | |
|---|---|---|
| PATENT NO. | : 11,709,865 B2 | Page 1 of 1 |
| APPLICATION NO. | : 16/732888 | |
| DATED | : July 25, 2023 | |
| INVENTOR(S) | : Ryan Eric King et al. | |

It is certified that error appears in the above-identified patent and that said Letters Patent is hereby corrected as shown below:

On the Title Page

Page 4, (56) References Cited, U.S. Patent Documents, Column 1:
8,644,684 B2 2/2014 Koshida et al. should read 8,644,684 B2 2/2014 Yoshida et al.

Page 5, (56) References Cited, U.S. Patent Documents, Column 1:
2004/0041836 A1 3/2004 Taner et al. should read 2004/0041836 A1 3/2004 Zaner et al.

Page 5, (56) References Cited, U.S. Patent Documents, Column 1:
2004/0078383 A1 4/2004 Merger et al. should read 2004/0078383 A1 4/2004 Mercer et al.

Signed and Sealed this
Nineteenth Day of September, 2023

Katherine Kelly Vidal
*Director of the United States Patent and Trademark Office*